United States Patent
Kajiwara

(10) Patent No.: US 8,452,112 B2
(45) Date of Patent: May 28, 2013

(54) IMAGE ENCODING APPARATUS AND METHOD OF CONTROLLING THE SAME

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 12/364,863

(22) Filed: Feb. 3, 2009

(65) Prior Publication Data

US 2009/0208125 A1 Aug. 20, 2009

(30) Foreign Application Priority Data

Feb. 19, 2008 (JP) ................................ 2008-037946

(51) Int. Cl.
*G06K 9/46* (2006.01)

(52) U.S. Cl.
USPC ........... 382/243; 382/176; 382/166; 382/173; 382/239; 382/233; 385/525; 385/539; 385/426.05; 385/450; 385/452

(58) Field of Classification Search
USPC .................. 382/176, 168, 173, 171, 243, 233, 382/239, 289, 300, 166, 299; 358/525, 539, 358/3.01, 462, 464, 465, 1.9, 426.05, 450, 358/452, 453, 537, 538, 540
See application file for complete search history.

(56) References Cited

U.S. PATENT DOCUMENTS

| | | | |
|---|---|---|---|
| 6,198,850 B1 * | 3/2001 | Banton | 382/239 |
| 6,628,833 B1 * | 9/2003 | Horie | 382/173 |
| 7,133,565 B2 * | 11/2006 | Toda et al. | 382/243 |
| 7,386,168 B2 * | 6/2008 | Misawa | 382/166 |
| 7,639,388 B2 * | 12/2009 | Saito | 358/1.18 |
| 7,876,959 B2 * | 1/2011 | Matsuda et al. | 382/176 |
| 8,041,135 B2 * | 10/2011 | Hosaki | 382/248 |
| 8,077,986 B2 * | 12/2011 | Tanaka | 382/232 |
| 2002/0037100 A1 * | 3/2002 | Toda et al. | 382/166 |
| 2003/0227648 A1 * | 12/2003 | Oshima et al. | 358/1.15 |
| 2004/0165782 A1 * | 8/2004 | Misawa | 382/239 |
| 2005/0180645 A1 * | 8/2005 | Hasegawa et al. | 382/239 |

FOREIGN PATENT DOCUMENTS

JP 2002-077633 3/2002

* cited by examiner

*Primary Examiner* — Mekonen Bekele
(74) *Attorney, Agent, or Firm* — Cowan, Liebowitz & Latman, P.C.

(57) ABSTRACT

This invention provides an apparatus which re-encodes encoded image data to generate encoded data at a higher compression ratio while suppressing any increase in the load of re-encoding. A decoder decodes each block stored in a storage, stores the decoding result in a buffer, and stores, in a holding unit, block information representing the location of the encoded data of each block in the storage. A discrimination unit discriminates a text area in the decoded image data. The image in the text area undergoes binarization and then character image data encoding. A fill-up unit replaces the value of a character/line art pixel in the text area with the average of non-character/line art pixel values. A re-encoder encodes the blocks after replacement. Inside the text area, a selector selects and outputs encoded data generated by the re-encoder. Outside the text area, the selector selects and outputs encoded data in the storage.

10 Claims, 24 Drawing Sheets

FIG. 2

| MCU IDENTIFICATION NUMBER | POSITION OF CODED DATA | LENGTH |
|---|---|---|
| 0 | p(0) | cl(0) |
| 1 | p(1) | cl(1) |
| 2 | p(2) | cl(2) |
| ... | ... | ... |
| i | p(i) | cl(i) |
| ... | ... | ... |
| W×H/64−1 | p(W×H/64−1) | cl(W×H/64−1) |

F I G. 5A

TextTextTextText

CHARACTER IMAGE DATA FOR TEXT AREA TR2

F I G. 5B

TextTextTextTextText
TextTextTextTextText
TextTextTextTextText
TextTextTextTextText
TextTextTextTextText
TextText

CHARACTER IMAGE DATA FOR TEXT AREA TR2

F I G. 5C

TextTextTextTextTextTextTextTextTextText
TextTextTextTextTextTextTextTextTextText
TextTextTextTextTextTextTextTextTextText
TextTextTextTextTextTextTextTextTextText
TextTextTextTextTextTextTextText

CHARACTER IMAGE DATA FOR TEXT AREA TR3

F I G. 12
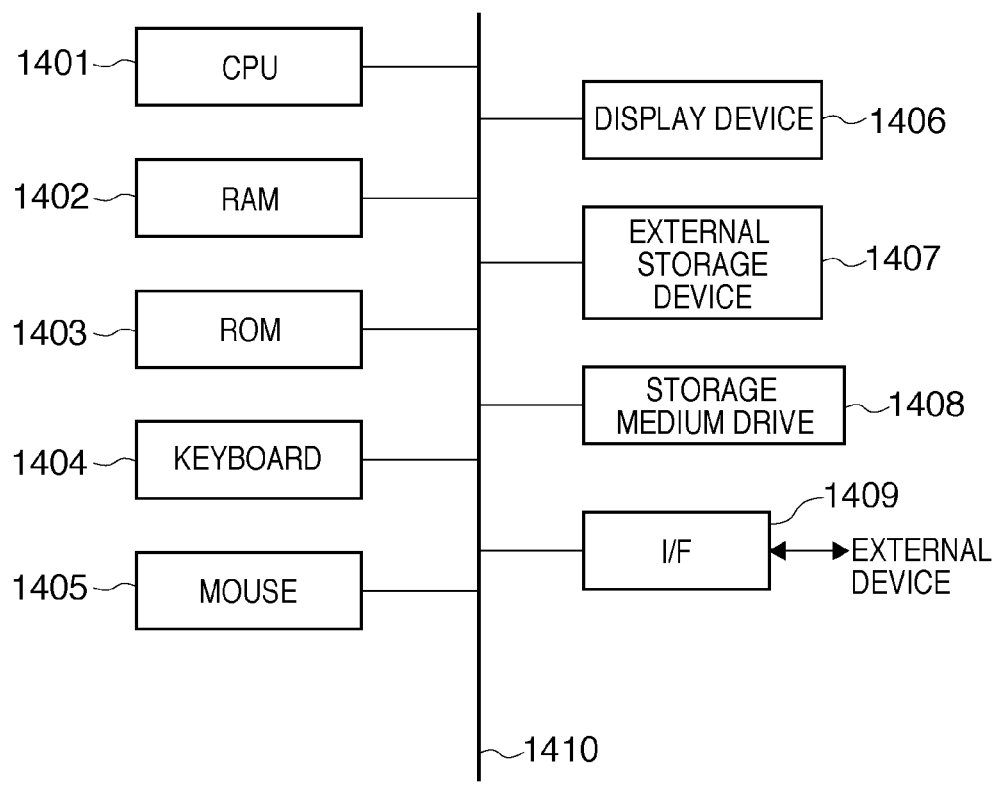

F I G. 13

| MCU IDENTIFICATION NUMBER | POSITION OF CODED DATA | LENGTH | QUANTIZED DC COEFFICIENT VALUE |
|---|---|---|---|
| 0 | p(0) | cl(0) | D(0),D1(0),D2(0) |
| 1 | p(1) | cl(1) | D(0),D1(0),D2(0) |
| 2 | p(2) | cl(2) | D(0),D1(0),D2(0) |
| ... | ... | ... | ... |
| i | p(i) | cl(i) | D(0),D1(0),D2(0) |
| ... | ... | ... | ... |
| W×H/64-1 | p(W×H/64-1) | cl(W×H/64-1) | D0(W×H/64-1), D1(W×H/64-1), D2(W×H/64-1) |

F I G. 17
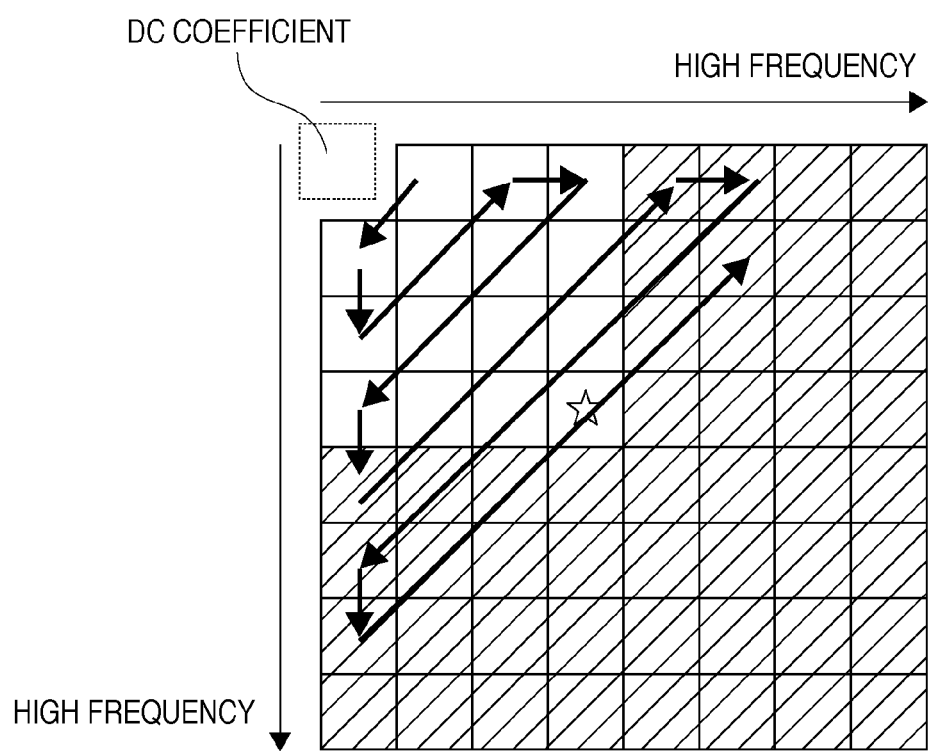

IMAGE ENCODING APPARATUS AND METHOD OF CONTROLLING THE SAME

BACKGROUND OF THE INVENTION

1. Field of the Invention

The present invention relates to an encoding technique of encoding image data.

2. Description of the Related Art

A conventional encoding technique separates an image into a foreground image such as a character portion containing binary data or limited colors and a portion (to be referred to as a background image hereinafter) such as a natural image except the foreground image, and applies different encoding methods to the respective parts.

For example, a character area of image data to be encoded is discriminated. Pixels in the character area are binarized to generate character image data. The character image data is encoded by MMR. On the other hand, the pixels (black pixels in general) of the character image are replaced with a pixel value in the ambient background image. This removes high-frequency components such as the character image. The image after replacement is encoded by JPEG. The MMR encoded data (the encoded data of the foreground image) and the JPEG encoded data (the encoded data of the background image) are integrated to output the encoding result of the original image.

In a decoding process, the encoded data of the background image is decoded. Then, only "character" portions of the character image obtained by decoding the encoded data of the foreground image (character image) are superimposed on the background image obtained by decoding.

The representative constituent element of the foreground image has been assumed to be a character. However, it need not always be a character. That is, an element including limited colors and having a sharp edge, such as a ruled line of a table, a line art, or a simple clipart can also be included in the foreground image.

The background image obtained by removing high-frequency components contains no high-frequency components literally or less high-frequency components. Human vision is insensible to high-frequency components. Even when the resolution of the background image is made slightly lower to remove the remaining high-frequency components, the degradation is not so noticeable and poses no problem. Hence, encoding is performed after decreasing both the horizontal and vertical resolutions of the background image to ½. As a result, the number of pixels of the image after resolution conversion is ¼ of that of the original image, and the encoded data can be generated at a high compression ratio. On the decoding side, after the encoded data of the background image is decoded, the resolution is converted to twice (twice in both the horizontal and vertical directions) using the interpolation technique. Then, the decoding result of the foreground image is superimposed on it. An example of a reference that discloses this technique is Japanese Patent Laid-Open No. 2002-77633.

The above-described technique of separating an original image into foreground and background images and encoding them requires a long time to analyze the structure of the document (to be referred to as a composite document hereinafter) containing both characters and a natural image and separate the foreground and background images. For example, the time required for the structure analysis and the separation process may exceed the time required for scanning one original page. In this case, the number of read original pages per unit time depends on the time required for the structure analysis and the separation process. That is, even when an image scanner capable of high-speed reading is prepared, it is impossible to make full use of the capabilities of the image scanner.

The following technique is supposed to solve this problem. Image data read by an image scanner is simply encoded without the structure analysis and the separation process. The encoded data is stored in a storage device as intermediate encoded data. This process is repeated as long as original pages to be read remain. On the other hand, the intermediate encoded data stored in the storage device is decoded. The structure of image data obtained by decoding is analyzed, and the image data is separated into the foreground image and the background image. The images are re-encoded using different encoding techniques. This process is repeated.

However, the number of pixels of image data is increasing enormously along with an increase in the resolution of input and output devices. The above-described decoding and re-encoding processes apply heavy load on both hardware and software.

Additionally, when background image data having lower resolution is encoded, the image quality may degrade because of a determination error of the foreground and background images. For example, if some of lines or pixel points of one or some characters of a character string are determined as the background, and encoding is performed in this state, a large difference in the image quality is generated between the portion encoded as the foreground and that encoded as the background.

SUMMARY OF THE INVENTION

It is an object of the present invention is to re-encode multilevel image data obtained by encoding each block without image area determination. It is another object of the present invention to provide a technique of generating encoded data at a higher compression ratio while suppressing any increase in the load of a process of separating image data into a foreground image such as a character or line art and a background image such as a natural image and re-encoding the image data.

In order to solve the above-described problems, according to the present invention, an image encoding apparatus of the present invention has the following arrangement.

According to one aspect of the present invention, there is provided an image encoding apparatus for inputting image data encoded for each pixel block formed from a plurality of pixels and re-encoding the image data, comprising an intermediate data storage unit which stores the encoded image data of re-encoding target as intermediate data, a decoding unit which decodes each block of the intermediate data stored in the intermediate data storage unit and stores the decoded image data in a buffer, a discrimination unit which discriminates a foreground image area including a character or line art by analyzing the image data stored in the buffer, an identification unit which identifies each pixel of image data inside the foreground image area discriminated by the discrimination unit as a character or line art pixel included in the character or line art or a non-character or line art pixel and generates identification information, a first encoding unit which encodes the identification information obtained by the identification unit and outputs the encoded identification information, a replacement unit which replaces a value of the character or line art pixel inside the foreground image area with a replacement value decided based on values of neighboring non-character or line art pixels, a second encoding unit which generates encoded data of each block based on the image data inside the foreground image area after replacement by the replacement unit and outputs the encoded data, and a third encoding unit which generates, outside the foreground image area, encoded data by referring to the encoded data of each pixel block stored in the intermediate data storage unit without decoding up to a pixel value, and outputs the encoded data.

According to the arrangement of the present invention, it is possible to generate encoded data at a higher compression ratio while suppressing any increase in the load of a process of separating image data into a foreground image such as a character or line art and a background image such as a natural image and re-encoding the image data when re-encoding multilevel image data obtained by encoding each pixel block without image area determination.

Further features of the present invention will become apparent from the following description of exemplary embodiments with reference to the attached drawings.

BRIEF DESCRIPTION OF THE DRAWINGS

FIG. 2 is a view showing the format of block information;

FIGS. 5A to 5C are views showing examples of character image data;

FIG. 12 is a block diagram showing the arrangement of an information processing apparatus according to the modification of the first embodiment;

FIG. 13 is a view showing the format of block information according to the second embodiment;

FIG. 17 is a view showing another masking process target area for 8×8 DCT coefficients;

DESCRIPTION OF THE EMBODIMENTS

The embodiments of the present invention will now be described in detail with reference to the accompanying drawings.

[First Embodiment]

Figure 1:
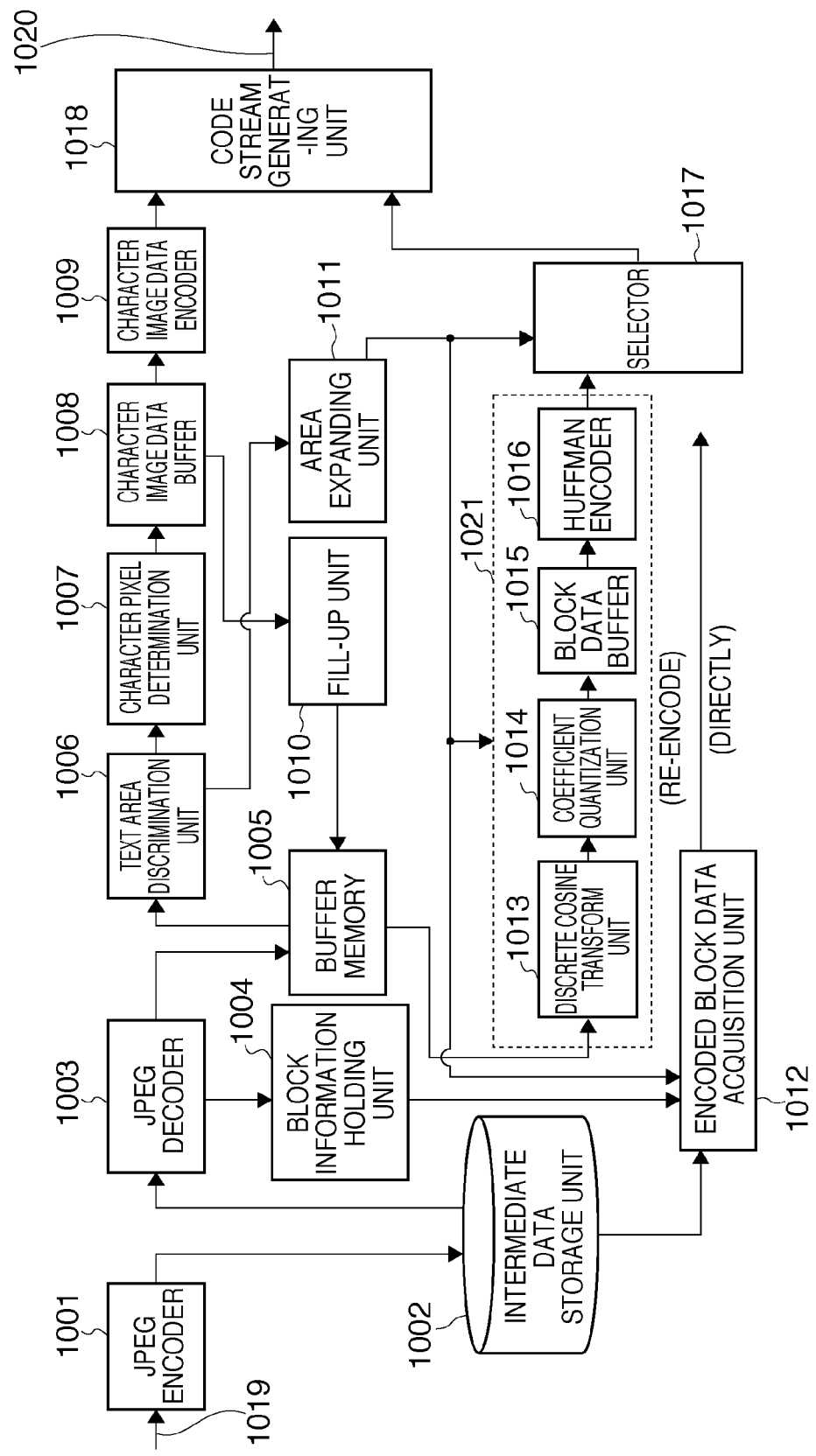
FIG. 1 is a block diagram showing the arrangement of an image encoding apparatus according to the first embodiment.

FIG. 1 is a block diagram showing the arrangement of an image encoding apparatus according to an embodiment.

In this embodiment, for example, multilevel image data read by an image scanner is directly encoded by JPEG. The resultant encoded image data is spooled in a storage device such as a hard disk as intermediate encoded data. The image encoding apparatus of this embodiment handles the spooled intermediate encoded data as a re-encoding target. More specifically, the image encoding apparatus decodes the spooled encoded data, separates the image data into foreground and background images, and re-encodes them. For the descriptive convenience, the image data generation source is assumed to be an image scanner. However, any other generation source such as a storage medium that stores image data may be used. The encoding process at the time of spooling is not indispensable in this embodiment. This embodiment is also applicable to an arrangement for sequentially re-encoding a plurality of image data encoded by JPEG in advance and stored in a storage device.

Image data is assumed to be RGB color image data containing components (color components) each represented by an 8-bit (256 tones) luminance value. However, the present invention is not limited to this and is also applicable to monochrome image data or CMYK color image data. The number of horizontal pixels of the image is represented by W, and the number of vertical pixels is represented by H. For the descriptive convenience, both W and H are assumed to be integer multiples of 8.

The sequence of a process of causing the image processing apparatus shown in FIG. 1 to encode an RGB color image containing components each represented by 8 bits will be described below.

First, encoding target image data is input from a signal line 1019. The pixel data input order is the raster scan order. One pixel is formed from three, R, G, and B components. The components are input in the order of R, G, and B. The component numbers of R, G, and B are defined as 0, 1, and 2, respectively. Coordinates (0,0) are set at the upper left corner of the image. The value of a component C of a pixel which is located at a horizontal right pixel position x and vertical lower pixel position y is expressed by P(x,y,C). For example, if a pixel located at a position (x,y)=(3,4) has components (R,G,B)=(255,128,0), the values of the components are expressed as P(3,4,0)=255, P(3,4,1)=128, and P(3,4,2)=0. Not the value of each component but the "pixel" at the position (x,y) is simply expressed by P(x,y).

A JPEG encoder 1001 stores, in an internal buffer memory (not shown) as needed, the pixel data input from the signal line 1019, encodes the data by Baseline of the international standard encoding method JPEG, and stores the obtained encoded data in an intermediate data storage unit 1002.

In this embodiment, the color conversion process and the sub-sampling process, which are generally executed as the pre-processes of JPEG encoding, are not performed for the descriptive convenience. The encoding unit, i.e., one MCU (Minimum Coded Unit) is a block of 8×8 pixels. However, a conversion process from RGB to another color expression scheme such as YCbCr or sub-sampling may be applied.

In another embodiment, a method other than JPEG Baseline, which encodes blocks each having a predetermined size, may be applied. Any encoding unit which ensures the correspondence between a given block and its encoded data is usable. In JPEG encoding, DC coefficients in an 8×8 pixel block are converted into difference values and encoded. That is, the encoded data of a block need not always be completely independent. However, the technique of segmenting an image into blocks and independently encoding them can ensure clear correspondence between each block and its encoded data and is suitable for the present invention. It is possible to obtain independent encoded data of each block in a general-purpose format using, e.g., FlashPix, JPEG Part3, or JPEG2000.

The JPEG encoder 1001 encodes each MCU (8×8 pixel block in this embodiment) of the input image data in the above-described way and stores the result in the intermediate data storage unit 1002. This process is repeated as long as the image to be encoded remains.

On the other hand, a JPEG decoder 1003 reads out the encoded data stored in the intermediate data storage unit 1002 and decodes it asynchronously with the JPEG encoder 1001 while storing the data in an internal buffer memory (not shown). The JPEG decoder 1003 stores the image data as the decoding result in a buffer memory 1005.

Since JPEG is a kind of variable length coding, the code length of the encoded data of an MCU block is not fixed. That is, the start position of the encoded data of each MCU block is unknown until the data is actually decoded. In this embodiment, each MCU block of the encoded data is accessed afterward. To do this, every time a decoding target MCU is read out from the intermediate data storage unit 1002, the JPEG decoder 1003 records information representing the position of the MCU in a block information holding unit 1004. In this embodiment, the position is represented by the start position and length (number of bits) of the encoded data of the MCU block. FIG. 2 shows the structure of information recorded in the block information holding unit 1004. Referring to FIG. 2, an MCU identification number represents the arrangement order in JPEG encoded data. Encoded MCU data are assigned MCU identification numbers in order so that an identifier "0" is assigned to the first encoded MCU data, "1" to the next encoded MCU data, . . . . In this embodiment, image data including W pixels in the horizontal direction and H pixels in the vertical directions is the encoding target. One MCU is an 8×8 pixel block. Hence, JPEG encoded data of one image data includes W×H/64 MCUs. For an MCU having an identification number i, a position p(i) and a length (number of bits) cl(i) of the encoded data are stored. The position p(i) of the encoded data is represented by the number of bits from the start of the JPEG encoded data. If the JPEG encoded data contains only one entropy-coded segment, the start position of the segment may be held separately, and the relative position from there may be held. In this case, the position p(i) of coded data of each MCU can be derived based on the length cl(i) of the encoded data of the MCU by $p(i)=\Sigma cl(j)$ $(j=0, 1, 2, \ldots, i-1)$ where $\Sigma$ is a sum function. Hence, the position of coded data need not be recorded.

A text area discrimination unit 1006 analyzes the structure of the decoded image data stored in the buffer memory 1005 and specifies high-frequency image portions such as characters and line arts (to be simply referred to as character portions hereinafter) in the image. The text area discrimination unit 1006 outputs information representing the circumscribed rectangle of each image portion as text area information (this may be referred to as character and line art area information or foreground image information). The method of creating the text area information will be described later.

The text area information specifies the position of a text area. In this embodiment, the text area information is represented by quaternary vectors (bx,by,ex,ey) formed by combining the pixel position (bx,by) of the upper left corner of the rectangle and the pixel position (ex,ey) of the lower right corner of the rectangle. The position may be specified using the pixel position of one (e.g., upper left corner) of the four corners and the numbers of horizontal and vertical pixels. Note that the number of text area information depends on the image, and no text area exists in some cases.

Figure 3:
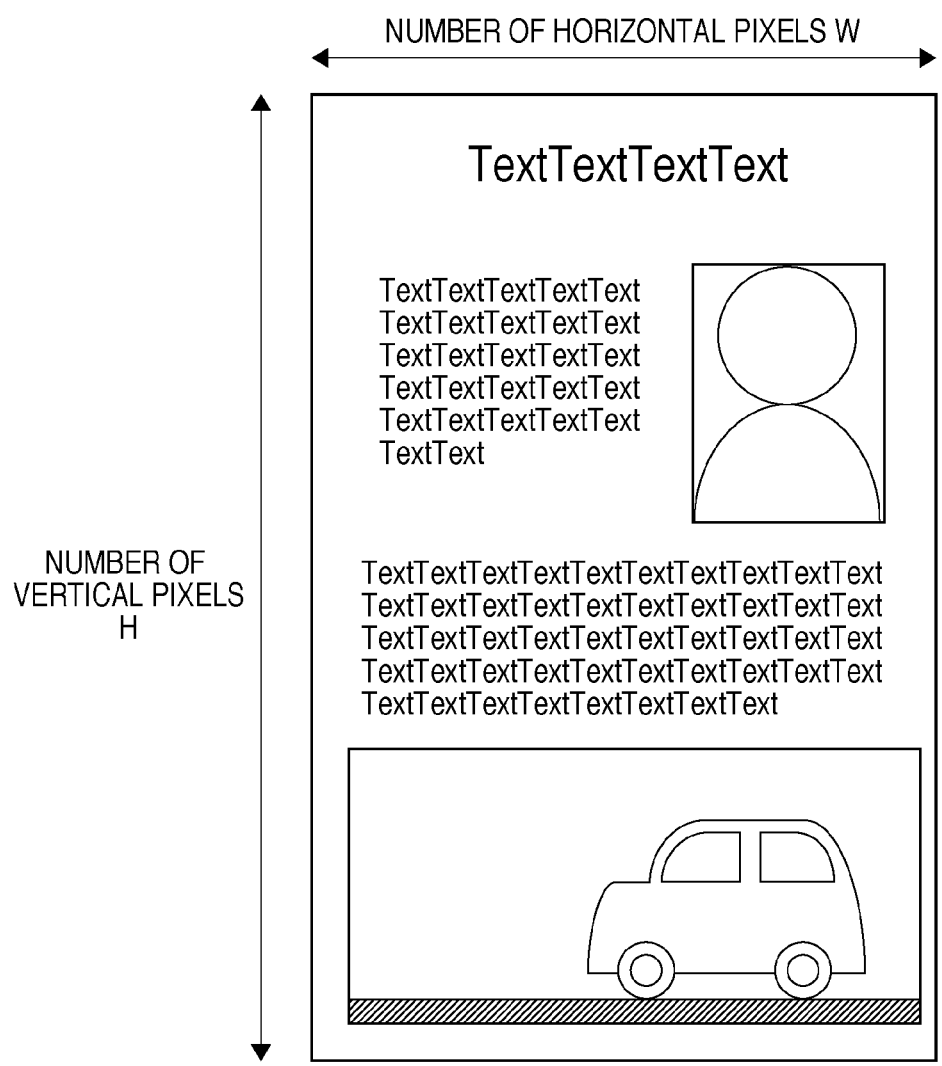
FIG. 3 is a view showing an example of an image containing both characters and photos.
Figure 4:
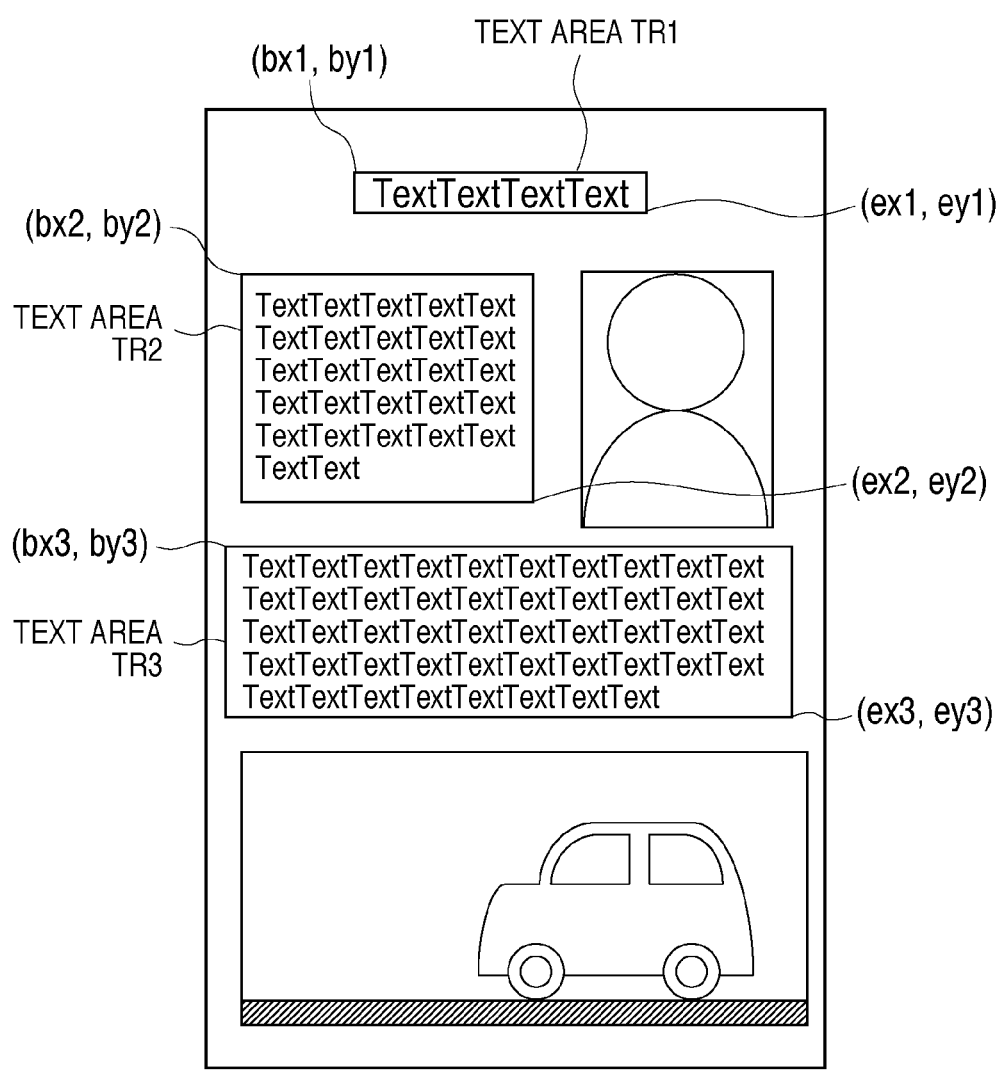
FIG. 4 is a view showing examples of text areas.

FIG. 3 is a view showing an example of an image (decoded document) containing both characters and photos suitable for encoding by the image encoding apparatus according to this embodiment. The image of the example has three text areas TR1, TR2, and TR3 shown in FIG. 4. Referring to FIG. 4, the upper left corner pixel position of a text area TRi identified by a number i (i=1, 2, . . . ) is represented by (bxi,byi), and the lower right corner pixel position is represented by (exi,eyi). Hence, the pieces of area information of the text areas TR1, TR2, and TR3 are (bx1,by1,ex1,ey1), (bx2,by2,ex2,ey2), and (bx3,by3,ex3,ey3), respectively.

Various kinds of detailed text area discrimination methods have been proposed. For example, a method disclosed in Japanese Patent Laid-Open No. 2002-77633 is usable. First, a binary image is generated based on the histogram of the luminance component of the image by defining a binarization threshold. Outline tracing is performed to extract each character as a cluster of black pixels (pixels whose density is higher than other pixels). Clusters that seem to be characters are left based on, e.g., the width and height. The clusters are grouped based on the positional relationship between them and the width and height of each cluster. A plurality of characters and the like are thus grouped. An area indicated by the circumscribed rectangle of the group is specified as a text area. This technique is used in this embodiment. However, each text area may be discriminated by any other technique.

A character pixel determination unit 1007 checks the feature of each pixel P(x,y) (bxi≦x≦exi, byi≦y≦eyi) included in each text area TRi (bxi,byi,exi,eyi) obtained by the text area discrimination unit 1006, and determines whether the pixel is a pixel (black pixel) of a character. If the pixel is included in a character or line art, "1" is set. Otherwise (if the pixel is included in a non-character or line art), "0" is set. The character pixel determination unit 1007 stores the data in a character image data buffer memory 1008 as binary character image data (binary image data) containing "0" and "1" data. That is, the binary image stored in the character image data buffer memory 1008 can be regarded either as binary image data or as identification information for identifying whether a pixel is a character or line art pixel or a non-character or line art pixel.

Various techniques have been proposed as the method of determining whether a pixel is included in a character. A method adaptive to the required accuracy or the allowable process complexity is used. In a simple method, the histogram of each component is checked in each text area, and a threshold is decided for each component. The thresholds are compared with the components P(x,y,C) of each pixel, thereby determining whether the pixel is a character pixel.

In this embodiment, the image of a luminance component for each color component is encoded. Hence, a pixel equal to or less than the decided threshold is determined as a pixel of a character, and a pixel more than the threshold is determined as a pixel of another portion (background). As can easily be understood by those skilled in the art, if the encoding target image data is YMC image data, a pixel having a value equal to or more than the threshold is determined as a pixel of a character, and a pixel except the pixel is determined as a pixel of a non-character.

The discrimination result of the pixel P(x,y) is defined as B(x,y), and the binary character image data generated from TRi is represented by BMi. When the text area discrimination unit 1006 outputs a plurality of text areas, the same process as described above is performed for each text area, thereby generating a plurality of character image data. FIGS. 5A to 5C show the outlines of character image data BM1, BM2, and BM3 obtained from the text areas TR1, TR2, and TR3 shown in FIG. 4, respectively. The average of the pixels P(x,y) in the image data of the decoding result, for which B(x,y) is "1", is calculated and held as the color of the character of the character image data BMi.

A fill-up unit 1010 obtains the average of pixels determined as background pixels, i.e., non-character pixels in the text area TRi (the area including characters or line arts) by referring to the decoded image data stored in the buffer memory 1005 and the character image data BMi stored in the character image data buffer 1008. The method of obtaining the average of the background positions in TRi specified by the coordinates (bxi,byi,exi,eyi) will be described below. First, the number Nt of background pixels in one text area, i.e., the number of pixels whose B(x,y)=0 (bxi≦x≦exi, byi≦y≦eyi) is obtained. Next, for each component C of the background pixels, a sum S(C) of luminance values is calculated by $$Nt=\Sigma\{1-B(x,y)\}$$

$$S(C)=\Sigma P(x,y,C)\times(1-B(x,y))$$

where x and y satisfy bxi≦x≦exi, and byi≦y≦eyi. "1−B(x, y)" is "1" when the pixel P(x,y) of interest is determined as a pixel of a non-character (when the pixel of interest is determined not to be a pixel of a character).

When S(C) and Nt are obtained, an average Av(C) of the components C of the background pixels is obtained by Av(C) =S(C)/Nt. The fill-up unit 1010 replaces the value of each character pixel of the decoded image data stored in the buffer 1005 with the obtained average Av(C). More specifically, each component value P(x,y,C) of the pixels P(x,y) whose B(x,y)=1 in TRi in the buffer 1005 is replaced with the calculated value Av(C).

The fill-up unit 1010 aims at replacing each pixel value to be encoded as the foreground with another value so as to decrease the difference from the neighboring pixels. In other words, the fill-up unit 1010 performs a process of removing high-frequency components represented by a character or line art. As a result, an image containing no high-frequency components or less high-frequency components is stored in the buffer 1005. This increases the encoding efficiency of the background image.

In this embodiment, foreground pixel values are replaced with the average of background pixels in a text area. Any other method is usable if the same effect can be obtained. For example, the average of background pixels may be calculated in a smaller unit such as an 8×8 block to replace foreground pixel values, or each foreground pixel value may be replaced with the average of neighboring background pixels. Alternatively, an immediately preceding background pixel value may simply be set.

As described above, the decoded image data stored in the buffer 1005 by the fill-up unit 1010 is converted into background image data without the foreground such as characters.

Figure 6:
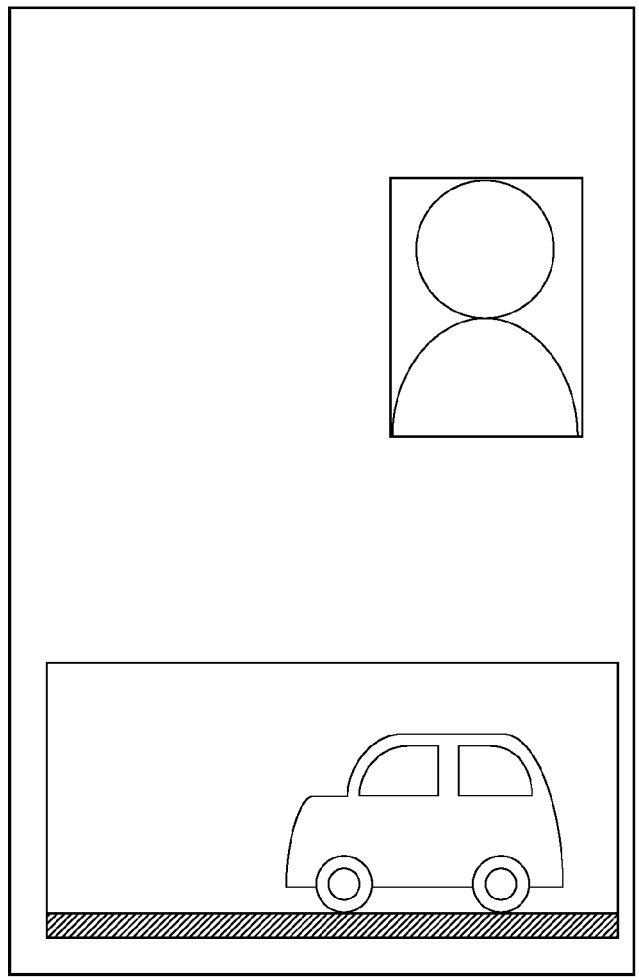
FIG. 6 is a view showing the outline of background image data generated by fill-up.

FIG. 6 shows the outline of final background image data stored in the buffer 1005 based on the image shown in FIG. 3.

A character image data encoder 1009 encodes the binary character image data BMi stored in the character image data buffer 1008 using the MMR (Modified Modified Read) encoding method that is the standard of G4 facsimile, and outputs the encoded data to a code stream generating unit 1018. In this case, MMR is used as an example of the binary image encoding method. However, any other encoding method such as JBIG or JBIG2 may be used, as a matter of course. However, lossless encoding is preferably used. The encoded data also has the color information of the characters of BMi.

On the other hand, each of a block re-encoder 1021 (functioning as a second encoder) and an encoded block data acquisition unit 1012 generates encoded background image data from the background image data generated in the buffer 1005 and outputs the encoded data to the code stream generating unit 1018.

The background image data encoding process is performed for each pixel block corresponding to an MCU of the intermediate data stored in the intermediate data storage unit 1002. In this embodiment, one MCU is formed from an 8×8 pixel block. Hence, the process is executed for each 8×8 pixel block (to be referred to as an MCU block hereinafter) in the raster scan order. In this embodiment, two systems are prepared to generate the encoded data of each MCU block (to be referred to as encoded MCU data hereinafter). One system acquires MCU block data of interest from the buffer 1005 and causes the block re-encoder 1021 to generate encoded MCU data. The other system directly extracts the encoded data of an MCU block (pixel block of interest) from the intermediate data stored in the intermediate data storage unit 1002, and outputs it as encoded data, instead of newly generating the encoded data of the MCU block of interest. The latter arrangement obviates any wasteful encoding process and shortens the time required for the process. The background image encoding process will be described below in more detail.

Before code generation of background image data, an area expanding unit 1011 will be described. The area expanding unit 1011 obtains an expanded text area ER1 by expanding the range of the text area TRi output from the text area discrimination unit 1006. The expanded text area is obtained because the x and y coordinates of the boundary of the text area TRi are not necessarily integer multiples of 8. The expanded text area ER1 is used as a selection criterion to determine which process should be used to generate the code of each MCU block, the re-encoding process by the block re-encoder 1021 or encoded MCU data extraction from the intermediate data storage unit 1002 by the encoded block data acquisition unit 1012. More specifically, if the MCU block of interest is located inside the expanded text area ER1, the block re-encoder 1021 newly generates the encoded data of the MCU block of interest. On the other hand, if the MCU block of interest is located outside the expanded text area ER1, the encoded block data acquisition unit 1012 reads out encoded MCU data from the intermediate data storage unit 1002 as the encoded data of the MCU block of interest and outputs it directly.

If the MCU block of interest is located inside the expanded text area ER1, a selector 1017 selects and outputs the encoded data from the block re-encoder 1021. If the MCU block of interest is located outside the expanded text area ER1, the selector 1017 selects and outputs the encoded data acquired by the encoded block data acquisition unit 1012.

In this embodiment, the expanded text area ER1 includes a group of MCU blocks including the text area TRi, and an area which has a width corresponding to one block and is added at the right end of the MCU block group. The expanded text area ER1 indicates the range of MCU blocks to be affected by foreground pixel fill-up by the fill-up unit 1010. That is, the encoded MCU data of the MCU blocks in the area ER1 may be different from the encoded MCU data stored in the intermediate data storage unit 1002. On the other hand, for an MCU block which is not included in any expanded text area ER1, the encoded MCU data stored in the intermediate data storage unit can be used directly. The width of one block is added at the right end in consideration of possible necessity of re-creating the DC differences due to the change of the immediately preceding MCU block.

Figure 7:
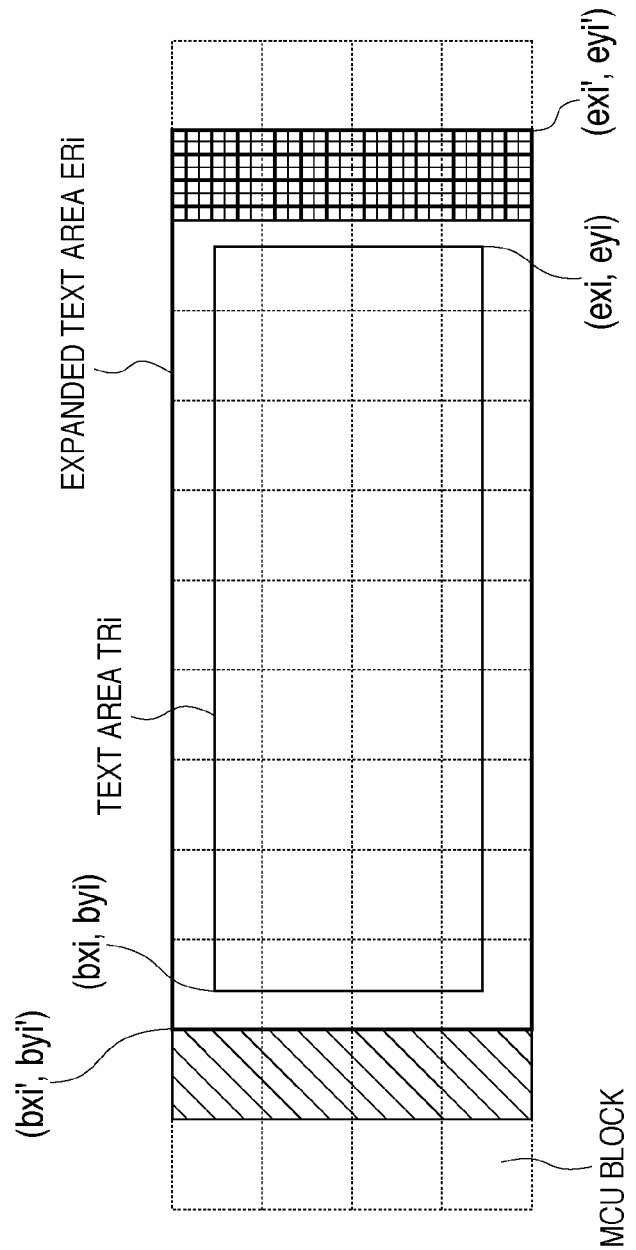
FIG. 7 is a view showing expansion of a text area TRi.

The method of expanding the text area TRi will be described with reference to FIG. 7. Referring to FIG. 7, one cell represents each MCU block. An area indicated by the bold solid line is the expanded text area ER1. A lattice area represents an area having a width corresponding to one block and added at the right end. With respect to the text area TRi specified by the coordinates (bxi,byi,exi,eyi), the coordinates of the expanded text area ER1 are (bxi',byi',exi',eyi') which are $$bxi' = \text{floor}(bxi/mw) \times mw$$

$$byi' = \text{floor}(byi/mh) \times mh$$

$$exi' = (\text{ceil}(exi/mw)+1) \times mw$$

$$eyi' = (\text{ceil}(eyi/mh)+1) \times mh$$

where mw and mh are the width and height of the MCU block, which are 8 in this embodiment, floor(x) is the maximum integer value that does not exceed the real value x, and ceil(x) is the minimum integer value equal to or more than the real value x.

The MCU block encoding process by the block re-encoder 1021 will be described next.

The block re-encoder 1021 includes a discrete cosine transform unit 1013, coefficient quantization unit 1014, block data buffer 1015, and Huffman encoder 1016, and executes the encoding process when the MCU of interest is located inside the expanded text area ER1. More specifically, the block re-encoder 1021 reads out the image data of the MCU block of interest from the buffer 1005 and executes discrete cosine transform, coefficient quantization, and Huffman coding for each of the RGB components. The MCU block encoding process executed here is based on the international standard JPEG, unless otherwise specified. As the quantization matrix of the coefficient quantization unit 1014 and the Huffman coding table of the Huffman encoder 1016 (also functioning as an entropy encoder), the same quantization matrix and the same Huffman coding table as those used by the JPEG encoder 1001 for generating intermediate encoded data are used.

When the MCU of interest is located outside the expanded text area ER1, the encoded block data acquisition unit 1012 (functioning as a third encoder) acquires corresponding encoded data from the intermediate data storage unit 1002 and outputs it to the selector 1017. More specifically, the encoded block data acquisition unit 1012 reads out the encoded MCU data of the MCU block of interest from the intermediate data storage unit 1002 by referring to information (position p(i) and length cl(i)) stored in the block information holding unit 1004 in association with the encoded MCU data, and outputs the encoded MCU data to the selector 1017.

The selector 1017 has already been described above. That is, the selector 1017 determines by referring to the information of the expanded text area ER1 output from the area expanding unit 1011 whether the MCU block of interest is located inside the expanded text area ER1. If the MCU block of interest is located inside the expanded text area ER1, the selector 1017 outputs, to the code stream generating unit 1018, the encoded MCU data output from the block re-encoder 1021. On the other hand, if the MCU block of interest is located outside the expanded text area ER1, the selector 1017 outputs, to the code stream generating unit 1018, the encoded MCU data extracted by the encoded block data acquisition unit 1012.

If the MCU block of interest is located outside the expanded text area ER1, basically, it is unnecessary to operate the block re-encoder 1021. To the contrary, if the MCU block of interest is located inside the expanded text area ER1, it is unnecessary to operate the encoded block data acquisition unit 1012. Hence, the output from the area expanding unit 1011 is supplied to the block re-encoder 1021 and the encoded block data acquisition unit 1012, as shown in FIG. 1.

As an exceptional process, for the immediately preceding blocks of the blocks at the left end of the expanded text area ER1, i.e., the four hatched blocks outside the left boundary of the expanded text area ER1 in the example shown in FIG. 7, the block re-encoder 1021 is operated even when they are located outside the expanded text area ER1. This is because the quantized value of the DC coefficient of an immediately preceding block is necessary when obtaining the difference between DC coefficient values in encoding of the next block. For the immediately preceding blocks of the expanded text area ER1, the block re-encoder 1021 is operated, but the codes output from it are discarded. In the above case, the DC component of an MCU is assumed to be encoded as the difference from the DC component of an immediately preceding MCU. However, if the image data of an MCU can be decoded in the MCU itself, the one-block column at the right end of the expanded text area in FIG. 7 is unnecessary.

Figure 8:
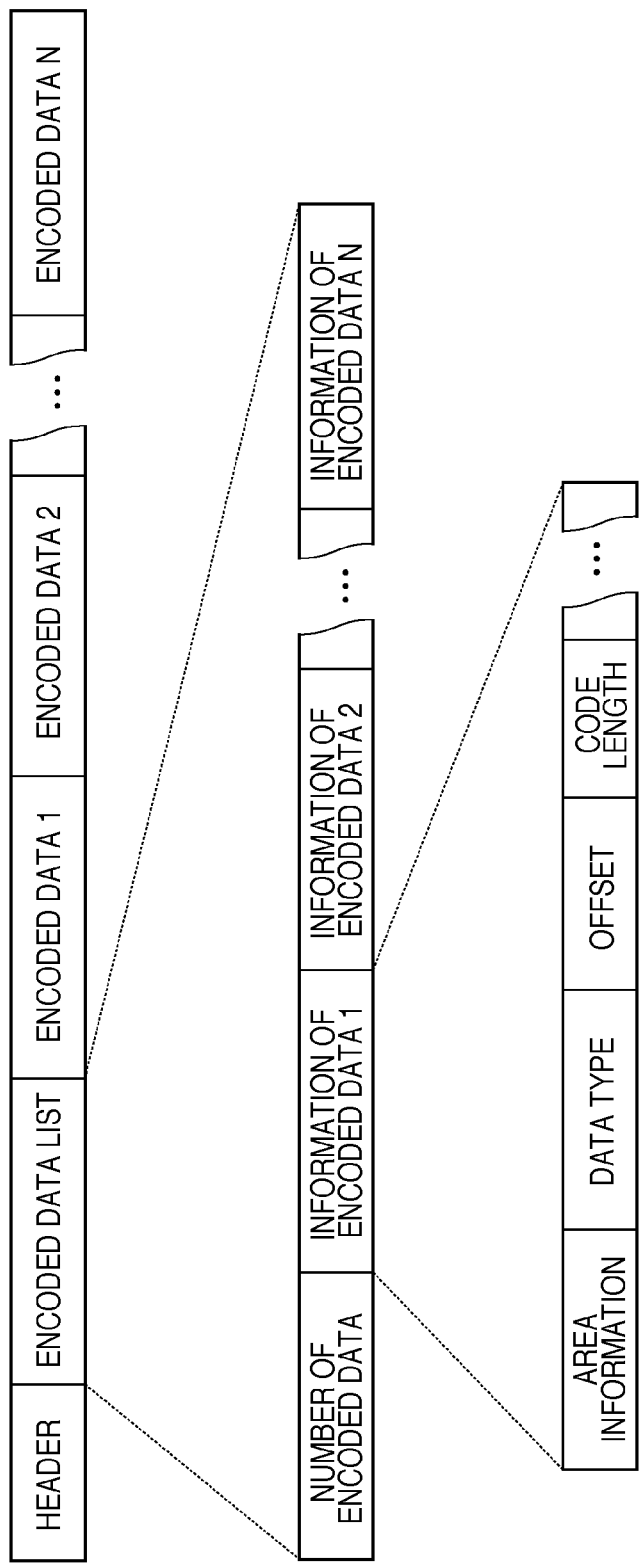
FIG. 8 is a view showing the structure of final encoded data generated in the first embodiment.

The code stream generating unit 1018 generates final encoded data in a predetermined format by adding various kinds of information necessary for decoding to the encoding results of the character image data and the background image data, and outputs the final encoded data outside the apparatus. At this time, the output from the character image data encoder 1009 and the output from the selector 1017 are stored in an internal buffer (not shown), as needed. FIG. 8 shows an example of the structure of final encoded data output from the code stream generating unit 1018. Various kinds of information necessary for decoding such as the numbers of horizontal and vertical pixels of the image, the number of color components and their types, and the number of bits of each component are added to the top (file header) of the final encoded data. The next encoded data list includes the total number N of encoded character image data and encoded background image data contained in the final encoded data, and information about each encoded data. The information of each encoded data includes the coordinate information of the rectangular area in the image corresponding to the encoded data, and the data type, offset, and code length of the encoded data. The coordinate information is represented by the upper left corner pixel position and lower right corner pixel position of the rectangular area. The data type is information for identifying whether the encoded data is character image data or background image data. The offset value of the encoded data is represented by the code length from the start position of the final encoded data to the start position of the encoded data of interest. As the code length, the length of the encoded data of interest is stored. The code structure shown in FIG. 8 is merely an example. Any other structure such as PDF can be used if it can integrally hold a plurality of encoded data.

For the encoded data generated by the image processing apparatus of this embodiment, the foreground image and background image are decoded, and the character portion of the foreground image is superimposed on the background image data, as described in "Description of the Related Art". Note that the header of the encoded data stores information representing the number of text areas (the number may be zero). If one or more text areas exist, the header also stores information for specifying the areas.

As described above, according to this embodiment, image data that is encoded by JPEG in advance is input and temporarily decoded. The image is separated into character images and background images. For each character image, pixels included in a character are encoded using encoding for characters. Additionally, pixels included in the character of each character image are replaced with a replacement value calculated from neighboring non-character pixels to remove or reduce high-frequency components, and then encoded by encoding for a halftone image. For the background image, the encoded MCU data of the input encoded data is effectively used to reduce the load of the re-encoding process. It is consequently possible to quickly generate encoded data at a higher compression ratio than the input encoded data.

[Modification of First Embodiment]

An example will be described below as a modification of the first embodiment, in which the first embodiment is implemented by a computer program.

FIG. 12 is a block diagram showing the arrangement of an information processing apparatus (e.g., personal computer) according to the modification.

Referring to FIG. 12, a CPU 1401 controls the overall apparatus using programs and data stored in a RAM 1402 or a ROM 1403 and also executes image encoding and decoding processes to be described later. The RAM 1402 has an area to store programs and data read out from an external storage device 1407 or a storage medium drive 1408 or downloaded from an external device via an I/F 1409. The RAM 1402 also has a work area to be used by the CPU 1401 to execute various kinds of processes. The ROM 1403 stores a boot program, setting programs of the apparatus, and data. A keyboard 1404 and a mouse 1405 can input various kinds of instructions to the CPU 1401.

A display device 1406 including a CRT or a liquid crystal screen can display information such as an image or a text. The external mass storage device 1407 is, e.g., a hard disk drive. The external storage device 1407 stores, e.g., an OS (Operating System), programs for image encoding and decoding processes to be described later, encoding target image data, and decoding target encoded data as files. The CPU 1401 loads the programs and data to a predetermined area on the RAM 1402 and executes them.

The storage medium drive 1408 reads out programs and data recorded on a storage medium such as a CD-ROM or a DVD-ROM and outputs them to the RAM 1402 or the external storage device 1407. Note that the programs for image encoding and decoding processes to be described later, encoding target image data, and decoding target encoded image data may be recorded on the storage medium. In this case, the storage medium drive 1408 loads the programs and data to a predetermined area on the RAM 1402 under the control of the CPU 1401.

The I/F 1409 connects an external device to the apparatus to enable data communication between them. For example, encoding target image data or decoding target encoded image data can also be input to the RAM 1402, external storage device 1407, or storage medium drive 1408 of the apparatus. A bus 1410 connects the above-described units.

In the above arrangement, when the apparatus is powered on, the CPU 1401 loads the OS from the external storage device 1407 to the RAM 1402 in accordance with the boot program in the ROM 1403. This enables input of the keyboard 1404 and the mouse 1405 and GUI display on the display device 1406. When the user instructs to activate an image processing application program stored in the external storage device 1407 by operating the keyboard 1404 or the mouse 1405, the CPU 1401 loads the program to the RAM 1402 and executes it. This allows the apparatus to function as an image encoding apparatus.

The process procedure of an image encoding application program executed by the CPU 1401 will be described below with reference to the flowchart in FIG. 9. This program basically includes functions corresponding to the constituent elements shown in FIG. 1. However, the block information holding unit 1004, buffer 1005, character image data buffer 1008, and block data buffer 1015 shown in FIG. 1 are allocated in the RAM 1402 in advance. The intermediate data storage unit 1002 is allocated in the external storage device 1407. An encoding result is stored in the external storage device 1407 as a file.

In step S901, the CPU 1401 starts a process of inputting encoding target image data from an external device (e.g., image scanner with ADF) connected via the I/F 1409, executing JPEG encoding, and storing image data obtained by encoding in the external storage device 1407 as intermediate encoded data (corresponding to the process of the JPEG encoder 1001). As a result, the external storage device 1407 stores the JPEG encoded data files of one or more encoding target images.

In step S902, one of the intermediate encoded data (encoded data files) stored in the external storage device 1407 is selected and decoded so that the decoded image is stored in the RAM 1402 (corresponding to the process of the JPEG decoder 1003). At this time, pieces of block information having the structure shown in FIG. 2 are generated and stored in the RAM 1402.

In step S903, the structure of the decoded intermediate data is analyzed, each text area TRi of the image is specified, and its position information is generated (corresponding to the process of the text area discrimination unit 1006).

In step S904, the feature of each pixel of each text area specified in step S903 is checked, and character image data representing whether the pixel is included in a character is generated (corresponding to the process of the character pixel determination unit 1007). The character image data is stored in the RAM 1402.

In step S905, for each pixel determined to be included in a character in step S904, the pixel value in the decoded image data stored in the RAM 1402 is replaced so as to decrease the difference from the neighboring pixels, thereby generating background image data (corresponding to the process of the fill-up unit 1010).

In step S906, the character image data generated in step S904 is encoded to generate encoded character image data (corresponding to the process of the character image data encoder 1009).

In step S907, the expanded text area ER1 of each text area TRi obtained in step S903 is obtained (corresponding to the process of the area expanding unit 1011).

In step S908, the encoded data of the background image data generated in step S905 is generated. Details of step S908 will be described later.

In step S909, the encoded character image data generated in step S906 and the encoded background image data generated in step S908 are integrated in a predetermined format, thereby generating and outputting final encoded data (corresponding to the process of the code stream generating unit 1018).

In step S910, it is determined whether all images are encoded. If NO in step S910, the process from step S902 is repeated.

Details of the process in step S908 of FIG. 9 will be described next with reference to the flowchart in FIG. 10.

In step S1001, 0 is set as the initial value of a variable i representing the identification number of an MCU.

In step S1002, it is determined whether an MCU(i) of interest is located inside of any one of the expanded text areas ER1. If YES in step S1002, the process advances to step S1008. Otherwise, the process advances to step S1003.

In step S1003, the position p(i) of coded data and the code length cl(i) of the MCU block of interest are read out from the block information stored in the RAM 1402. In step S1004, data corresponding to cl(i) bits from the p(i)th bit of the intermediate data stored in the external storage device 1407 are extracted and output as the codes of the MCU block of interest. The processes in steps S1003 and S1004 correspond to the process of the encoded block data acquisition unit 1012.

In step S1005, it is determined whether the MCU block of interest is located on the left side of the expanded text area. If YES in step S1005, the process advances to step S1006. Otherwise, the process advances to step S1010.

In step S1006, the image data of the block of interest is extracted from the decoded image of the intermediate data stored in the RAM 1402.

In step S1007, the block image data extracted in step S1006 undergoes discrete cosine transform and quantization to generate a quantized coefficient value (the quantized value of a DC component). The generated value is used for encoding of the next MCU.

On the other hand, if the MCU(i) is located inside an expanded text area, the pixel data of the block of interest is extracted, in step S1008, from the decoded image of the intermediate data stored in the RAM 1402.

In step S1009, the pixel data of the block extracted in step S1008 undergoes discrete cosine transform, quantization, and Huffman coding to generate encoded MCU data.

The processes in steps S1006, S1007, S1008, and S1009 correspond to the process of the block re-encoder 1021.

In step S1010, to shift the process target to the next MCU, the variable i is incremented by one and updated.

In step S1011, it is determined whether all MCU blocks have been processed. If an unprocessed MCU block remains, the process returns to step S1002 to continue the process. If all MCU blocks have been processed, the encoding process ends.

The modification can provide the same functions and effects as in the first embodiment, as is apparent from the above description. More specifically, in adaptive coding in which image data is separated into character image data and background image data, and they are encoded by suitable encoding methods, use of temporarily stored intermediate data reduces the block re-encoding process for acquiring encoded background image data.

The sequence of the processes is not limited to that described above. For example, the character image data encoding in step S906 of FIG. 9 can be performed at any timing between steps S904 and S909. In the modification, the intermediate data is stored in the external storage device 1407. However, it may be held in an area allocated in the RAM 1402.

[Second Embodiment]

In the first embodiment and its modification, all data in an expanded text area are re-encoded. In the second embodiment, intermediate encoded data is used as much as possible for portions in an expanded text area which can use it.

In the second embodiment as well, encoding target image data is RGB image data. However, the embodiment is also applicable to monochrome image data or CMYK color image data. An image is assumed to include W horizontal pixels and H vertical pixels.

Figure 11:
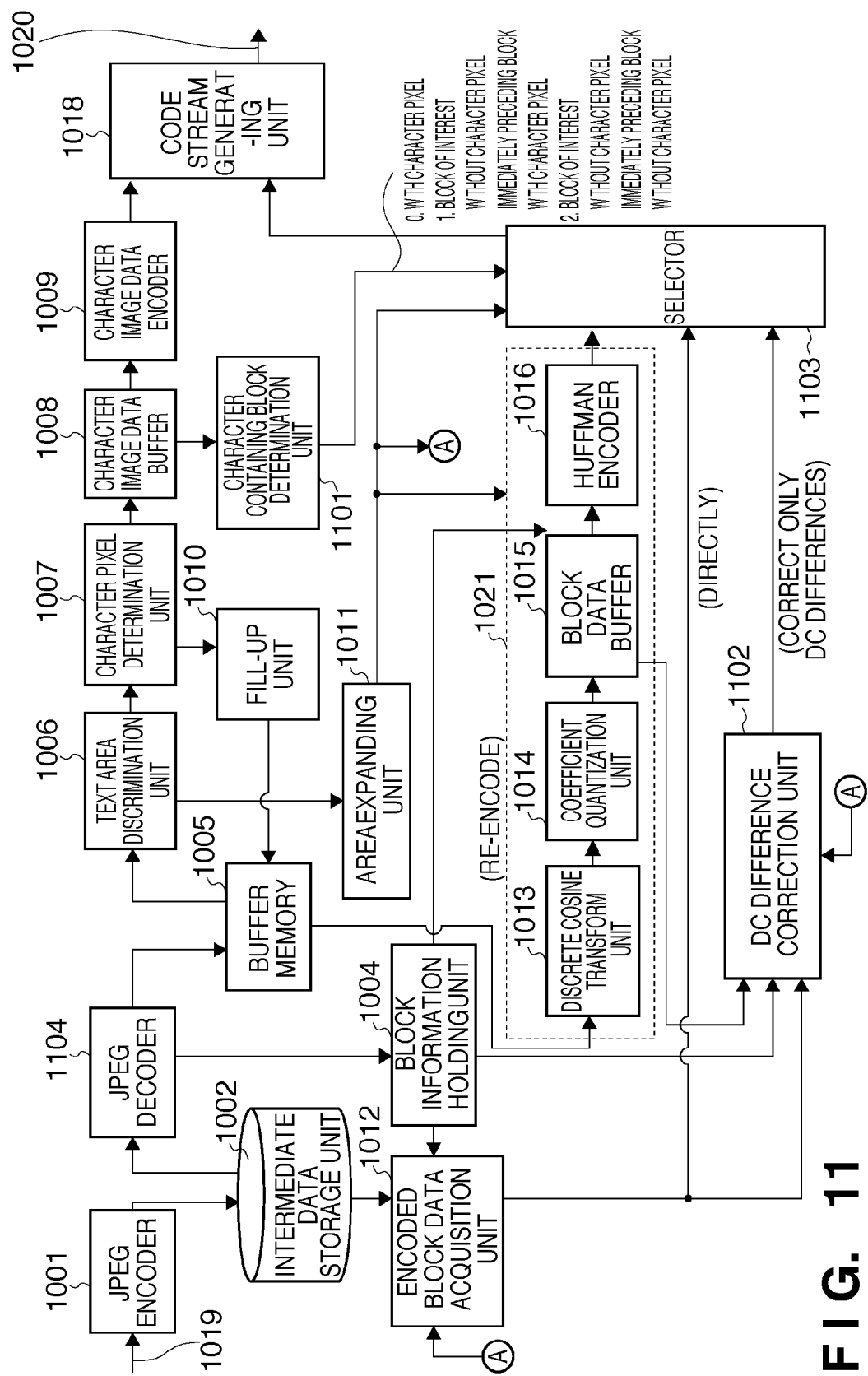
FIG. 11 is a block diagram showing the arrangement of an image encoding apparatus according to the second embodiment.

FIG. 11 is a block diagram showing the arrangement of an image processing apparatus according to the second embodiment. The same reference numerals as in FIG. 1 described in the first embodiment denote blocks having the same functions in FIG. 11.

The arrangement shown in FIG. 11 is different from that in FIG. 1 of the first embodiment in that a character containing block determination unit 1101 and a DC difference correction unit 1102 are added. Additionally, a 3-input 1-output selector 1103 is added in place of the 2-input 1-output selector, and a JPEG decoder 1104 whose process is slightly different from that of the JPEG decoder 1003 is used. The remaining components are the same as in the first embodiment, and a description thereof will not be repeated.

An image encoding process of the second embodiment will be described below.

The JPEG decoder 1104 reads out JPEG encoded data stored in an intermediate data storage unit 1002 and decodes it. Image data obtained by decoding is stored in a buffer 1005. At this time, the JPEG decoder 1104 records the start position and length (number of bits) of each MCU in a block information holding unit 1004, like the JPEG decoder 1003 described in the first embodiment. In the second embodiment, the quantized DC coefficient value of each component obtained upon decoding each MCU is also recorded. FIG. 13 shows the structure of block information stored in the block information holding unit 1004 according to this embodiment. Referring to FIG. 13, D0($i$) represents the quantized DC coefficient value of the first component (R component in the embodiment) of a block having an MCU identification number i; D1($i$), quantized DC coefficient value of the second component (G component); and D2($i$), the quantized DC coefficient value of the third component (B component).

The character containing block determination unit 1101 determines by referring to a character image data buffer 1008 whether an MCU block of interest in an expanded text area ER1 includes a pixel of a character. The character image data buffer 1008 stores binarized image data, i.e., data in which a pixel of a character has a value "1", and a pixel of a non-character has a value "0". Hence, the character containing block determination unit 1101 determines whether a "1" pixel exists in the pixel block (MCU) of interest. An MCU including a character pixel will be referred to as a character containing block hereinafter.

If the MCU block of interest is not a character containing block, the character containing block determination unit 1101 of this embodiment determines whether an immediately preceding (left) MCU block is a character containing block. The character containing block determination unit 1101 outputs the determination result. The determination result is ternary (2 bits suffice). If not the MCU of interest but the immediately preceding block is a character containing block, the determination result is "1". If neither the MCU of interest nor the immediately preceding block is a character containing block, the determination result is "2".

The DC difference correction unit 1102 executes a process when the determination result from the character containing block determination unit 1101 is "1". More specifically, the quantized DC coefficient values (D0(i), D1(i), and D2(i) in FIG. 13) of the components of the MCU block of interest are acquired from the block information holding unit 1004. Then, the quantized DC coefficient values of the immediately preceding block stored in a block data buffer 1015 are extracted. The DC difference values between the quantized DC coefficient values are obtained and encoded, thereby obtaining the codes of the DC differences. Next, the DC difference correction unit 1102 reads out encoded MCU data of the block of interest from a encoded block data acquisition unit 1012, decodes the Huffman codes, replaces the codes of the DC differences of the respective components with the obtained codes of the DC difference values, and outputs the encoded data to the selector 1103. The quantization matrix and the Huffman table used here are shared by the JPEG encoder 1001, JPEG decoder 1104, and block re-encoder 1021.

Figure 21:
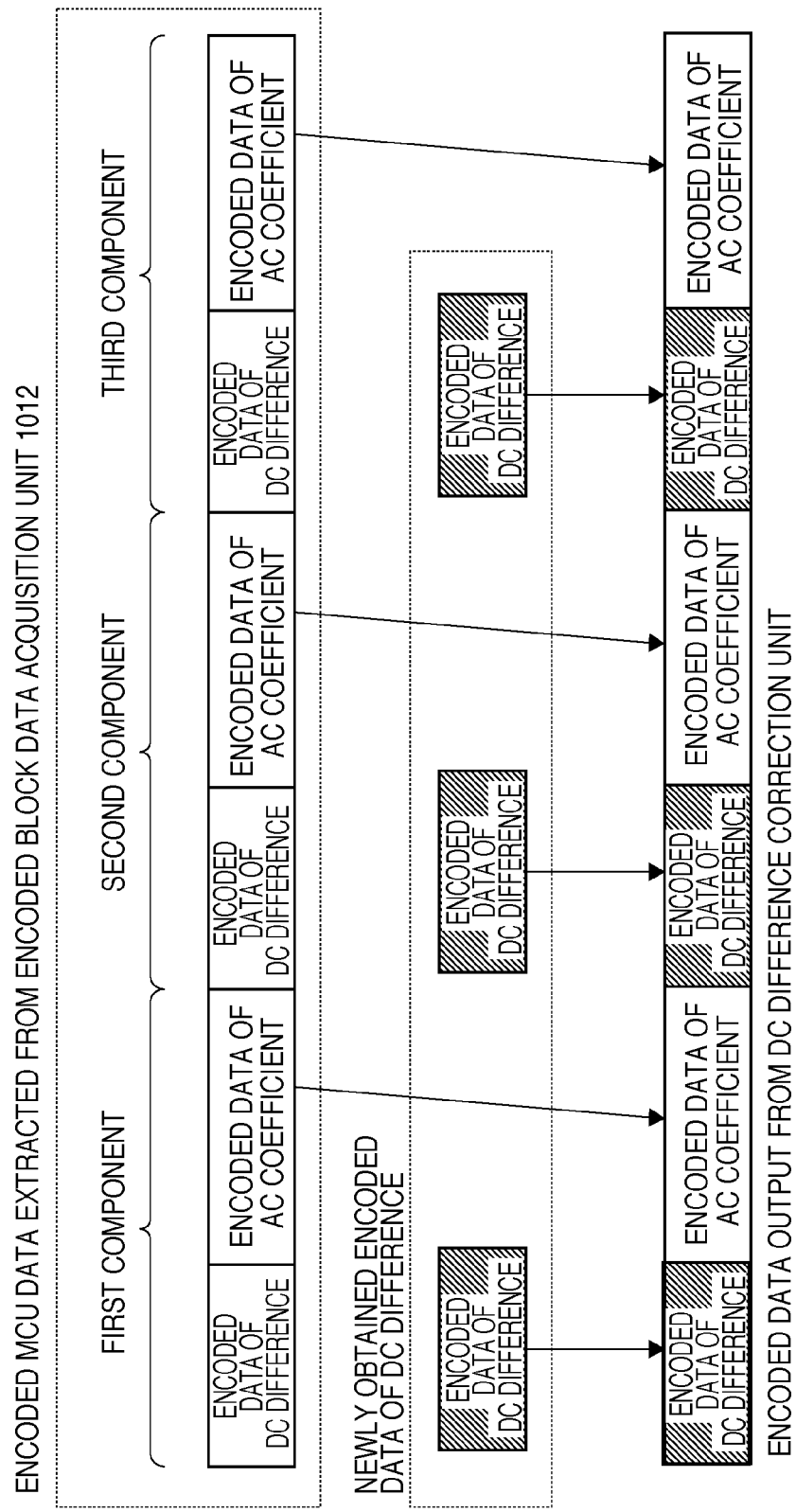
FIG. 21 is a view for explaining a process of generating encoded MCU data by correcting DC differences.

FIG. 21 shows a process of generating encoded data by correcting only the encoded data of DC differences. In this embodiment, the DC difference correction unit 1102 decodes Huffman codes and searches for the codes of DC difference values. However, as another embodiment, the block information holding unit may record the code length of the encoded data of a DC difference and the code length of the encoded data of an AC coefficient of each component in the intermediate data at the time of decoding. In this case, the DC difference correction unit 1102 can specify the position and length of the encoded data of each DC difference based on these pieces of information and replace the codes.

The selector 1103 acquires the encoded data of the MCU block of interest from one of the block re-encoder 1021, encoded block data acquisition unit 1012, and DC difference correction unit 1102 by referring to the determination result output from the character containing block determination unit 1101 and expanded text area information output from an area expanding unit 1011, and outputs the selected encoded data to a code stream generating unit 1018. This will be described below in detail.

The selector 1103 determines, by referring to the information of the expanded text area ER1 output from the area expanding unit 1011, whether the MCU block of interest is located inside the expanded text area ER1. If the MCU block of interest is located outside the expanded text area ER1, the encoded MCU data extracted by the encoded block data acquisition unit 1012 is output to the code stream generating unit 1018, as in the first embodiment.

On the other hand, if the MCU block of interest is located inside the expanded text area ER1, the operation changes depending on the determination result output from the character containing block determination unit 1101, unlike the first embodiment. If the determination result from the character containing block determination unit 1101 is "0", i.e., the MCU block of interest is a character containing block, the selector 1103 outputs the encoded data of the MCU of interest output from the block re-encoder 1021. If the determination result from the character containing block determination unit 1101 is "1", i.e., not the MCU block of interest but the immediately preceding block is a character containing block, the selector 1103 acquires the encoded data from the DC difference correction unit 1102 and outputs it. If the determination result is "2", i.e., neither the MCU block of interest nor the immediately preceding block is a character containing block, the selector 1103 outputs the encoded data from the encoded block data acquisition unit 1012.

If the encoded data from the block re-encoder 1021 should not be selected, the block re-encoder 1021 need not operate. In the above-described first embodiment, the block re-encoder 1021 is operated for the purpose of obtaining the quantized DC coefficient values of blocks on the left side of the expanded text area, and encoded data are discarded. In the second embodiment, the quantized DC coefficient values of the immediately preceding blocks, which are necessary at the start of the operation of the block re-encoder 1021, can be obtained from the block information holding unit 1004. For this reason, the dummy operation is unnecessary.

As described above, according to the second embodiment, in adaptive coding in which image data is separated into character image data and background image data, and they are encoded by suitable encoding methods, use of temporarily stored intermediate data reduces the block re-encoding process for acquiring encoded background image data. Especially, it is possible to reduce the number of blocks to be re-encoded by using encoded data even inside a text area.

[Modification of Second Embodiment]

An example will be described below in which the process of the second embodiment is implemented by a computer program. The apparatus arrangement can be the same as in the modification of the first embodiment shown in FIG. 12, and a description thereof will not be repeated. The procedure of a process of causing a CPU 1401 to execute an application program stored in an external storage device 1407 in FIG. 12 will be described below with reference to the flowcharts in FIGS. 15A and 15B. This program can easily be understood as a program basically including functions (subroutines) corresponding to the constituent elements shown in FIG. 11. However, the buffer 1005, block information holding unit 1004, and character image data buffer 1008 shown in FIG. 11 are allocated in a RAM 1402 in advance. The intermediate data storage unit 1002 is allocated in the external storage device 1407.

Figure 9:
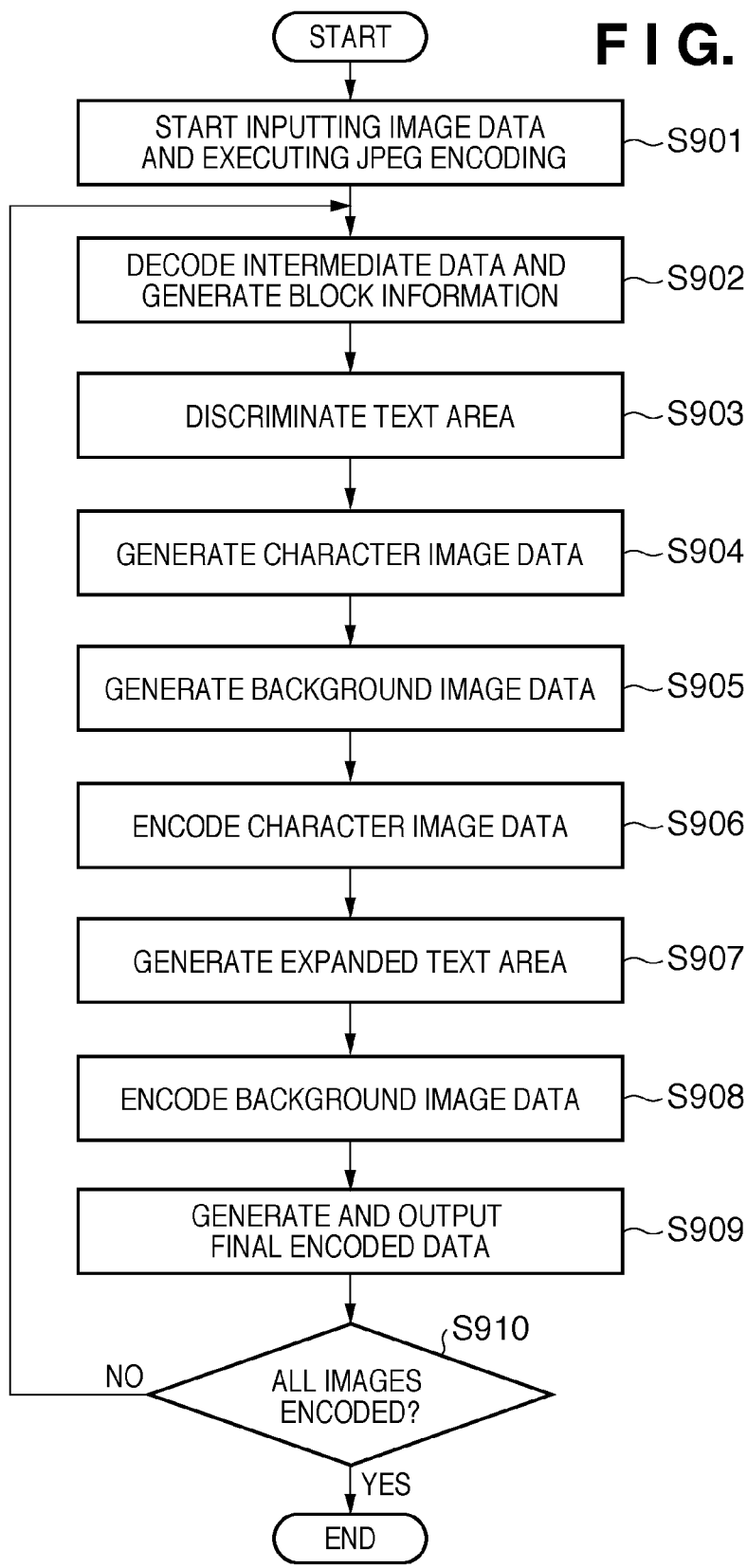
FIG. 9 is a flowchart illustrating the procedure of an encoding process according to a modification of the first embodiment.
Figure 10:
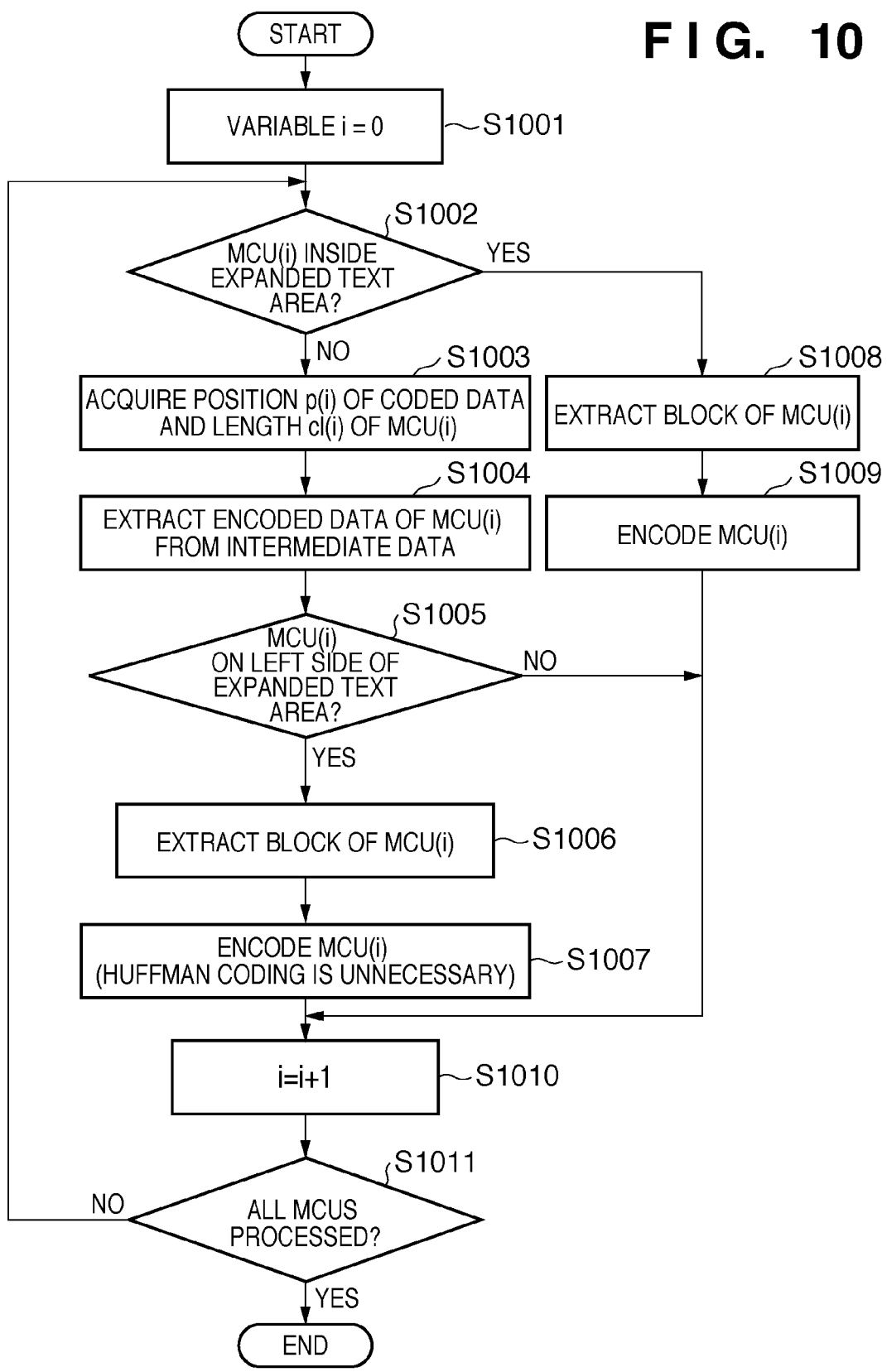
FIG. 10 is a flowchart illustrating the procedure of a background image encoding process according to the modification of the first embodiment.

The overall sequence of the process of the image processing application program executed by the CPU 1401 is the same as in FIG. 9 described in the first embodiment. However, as described above in the second embodiment, block information having the structure shown in FIG. 13 is recorded when decoding intermediate encoded data, i.e., in step S902 of FIG. 9. Additionally, in the modification of the second embodiment, the contents of the process in step S908 where background image data is encoded are different.

Figure 15A:
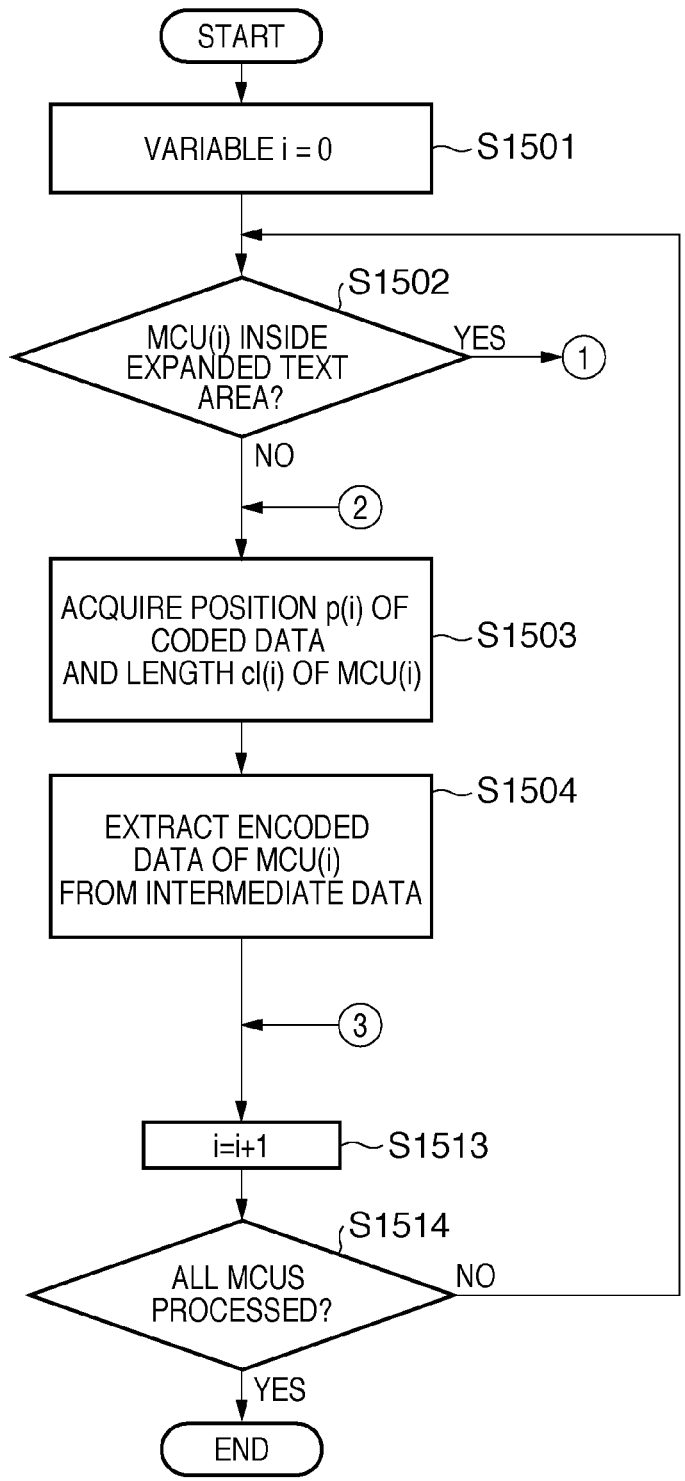
FIGS. 15A and 15B are flowcharts illustrating the procedure of a background image encoding process according to a modification of the second embodiment.
Figure 15B:
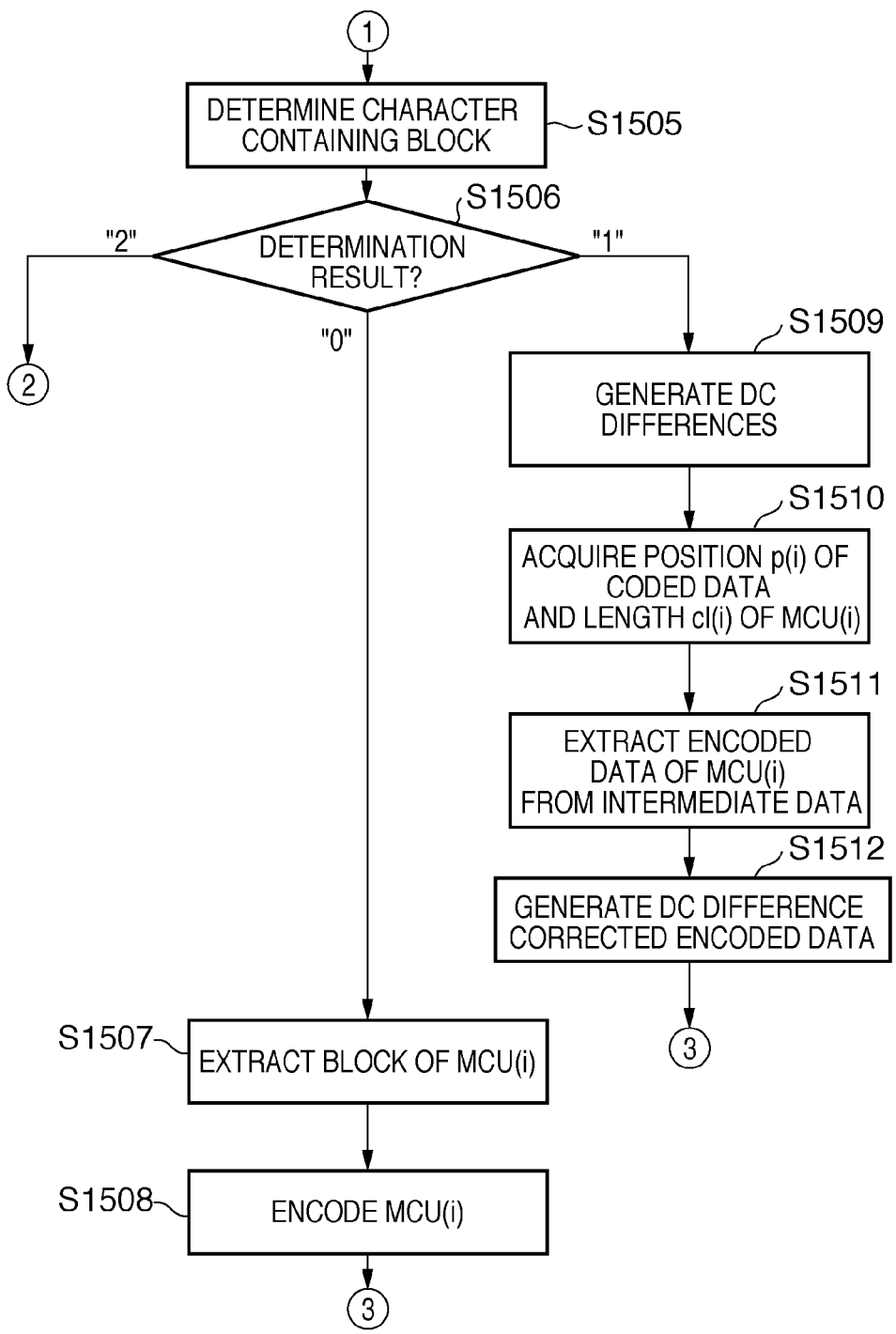

FIGS. 15A and 15B are flowcharts illustrating details of step S908. The sequence of the background image data encoding process will be explained below with reference to the flowchart in FIGS. 15A and 15B.

In step S1501, 0 is set as the initial value of a variable i representing the identification number of an MCU.

In step S1502, it is determined whether an MCU(i) of interest is located inside of any one of the expanded text areas ER1. If YES in step S1502, the process advances to step S1505. Otherwise, the process advances to step S1503.

In step S1503, a position p(i) of coded data and a code length cl(i) of the MCU block of interest are read out from the block information stored in the RAM 1402.

In step S1504, data corresponding to cl(i) bits from the p(i)th bit of the intermediate encoded data stored in the external storage device 1407 are extracted and output as the codes of the MCU block of interest.

The processes in steps S1503 and S1504 correspond to the process of the encoded block data acquisition unit 1012.

In step S1505, it is determined whether the MCU block of interest is a character containing block including a pixel of a character. If the MCU block of interest is not a character containing block, it is confirmed whether the immediately preceding MCU block is a character containing block, and a ternary determination result is output (corresponding to the process of the character containing block determination unit 1101).

In step S1506, the process is switched based on the determination result obtained in step S1505. If the determination result is "0", the process advances to step S1507. If the determination result is "1", the process advances to step S1509. If the determination result is "2", the process advances to step S1503.

In step S1507, the pixel data of the block of interest is extracted from the decoded image of the intermediate data stored in the RAM 1402.

In step S1508, the pixel data of the block extracted in step S1507 undergoes discrete cosine transform, quantization, and Huffman coding to generate encoded MCU data.

In step S1509, the quantized DC coefficient value of each component of the immediately preceding block is acquired from the RAM 1402. Additionally, the quantized DC coefficient value of each component of the block of interest is acquired from the block information stored in the RAM 1402. DC differences are calculated and encoded.

In step S1510, the position p(i) of coded data and the code length cl(i) of the MCU block of interest are read out from the block information stored in the RAM 1402.

In step S1511, data corresponding to cl(i) bits from the p(i)th bit of the intermediate data stored in the external storage device 1407 are extracted.

In step S1512, the encoded MCU data extracted in step S1511 is decoded to specify the position and length of the encoded data of the DC difference of each component. The encoded data of the DC difference is replaced with the encoded data of the DC difference obtained in step S1509 and output.

The processes in steps S1509, S1510, S1511, and S1512 correspond to the process of the DC difference correction unit 1102.

In step S1513, to shift the process target to the next MCU, the variable i is incremented by one and updated.

In step S1514, it is determined whether all MCU blocks have been processed. If an unprocessed MCU block remains, the process returns to step S1502 to continue the process. If all MCU blocks have been processed, the encoding process ends.

The modification can provide the same functions and effects as in the second embodiment, as is apparent from the above description. More specifically, in adaptive coding in which image data is separated into character image data and background image data, and they are encoded by suitable encoding methods, use of temporarily stored intermediate data reduces the block re-encoding process for acquiring encoded background image data. Especially, it is possible to reduce the number of blocks to be re-encoded by using encoded data even inside a text area.

The sequence of the processes is not limited to that described above. For example, the DC difference generation process in step S1509 of FIG. 15B need only be executed before the encoded data generation by correcting the DC differences in step S1512. Step S1509 may be performed in parallel to steps S1510 and S1511. The order of these steps may be changed. In the modification, the intermediate encoded data is stored in the external storage device 1407. However, it may be held in an area allocated in the RAM 1402.

[Third Embodiment]

In the image processing apparatuses of the first and second embodiments, the resolution held by background image data is the same as that held by foreground image data and intermediate data. However, in separation and encoding of the foreground and background images, foreground and background images having different resolutions can be encoded. In the third embodiment of the present invention, an example will be described in which higher compression performance is obtained by lowering the resolution of a background portion (an image mainly containing low-frequency components) where the visual degradation is relatively unnoticeable.

Figure 16:
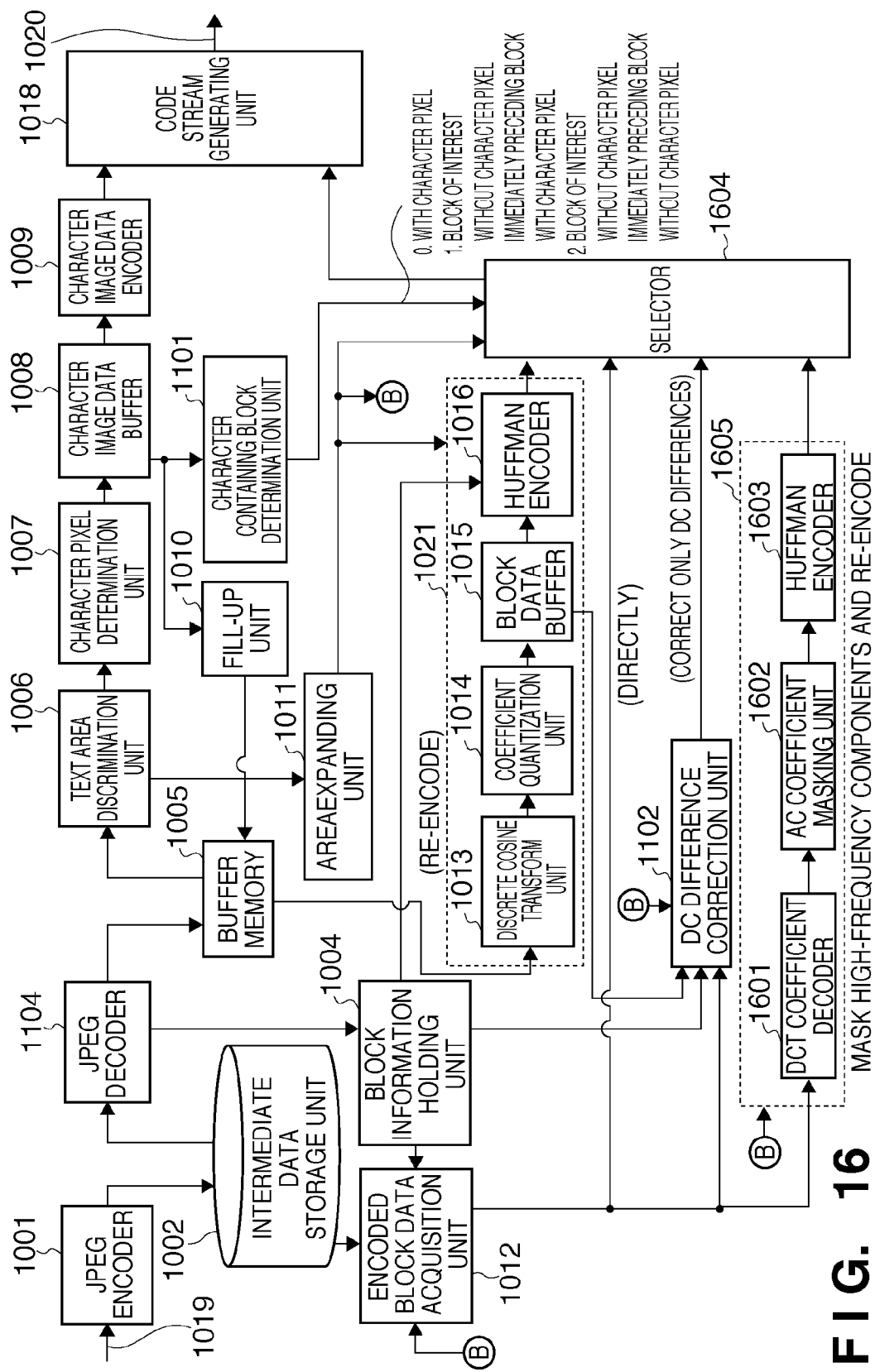
FIG. 16 is a block diagram showing the arrangement of an image encoding apparatus according to the third embodiment.

FIG. 16 is a block diagram showing the arrangement of an image processing apparatus according to the third embodiment. The same reference numerals as in FIGS. 1 and 11 described in the first and second embodiments denote blocks having the same functions in FIG. 16.

The arrangement shown in FIG. 16 is different from that in FIG. 11 of the second embodiment in that a 4-input 1-output selector 1604 is provided in place of the 3-input 1-output selector 1103, and a high-frequency component masking re-encoder 1605 including a DCT coefficient decoder 1601, AC coefficient masking unit 1602, and Huffman encoder 1603 is added. The remaining components are the same as in the second embodiment, and a description thereof will not be repeated.

An image encoding process of the third embodiment will be described below.

The high-frequency component masking re-encoder 1605 extracts, from a encoded block data acquisition unit 1012, encoded MCU data of interest for an MCU block of interest, masks the quantized coefficient values of some high-frequency components with 0, regenerates encoded data, and outputs it.

The blocks in the high-frequency component masking re-encoder 1605 will be described below.

The DCT coefficient decoder 1601 decodes Huffman encoded data and reconstructs the quantized coefficient value matrix of each component (note that this decoding is not performed up to image data). The DC coefficients are held as difference values.

Figure 14:
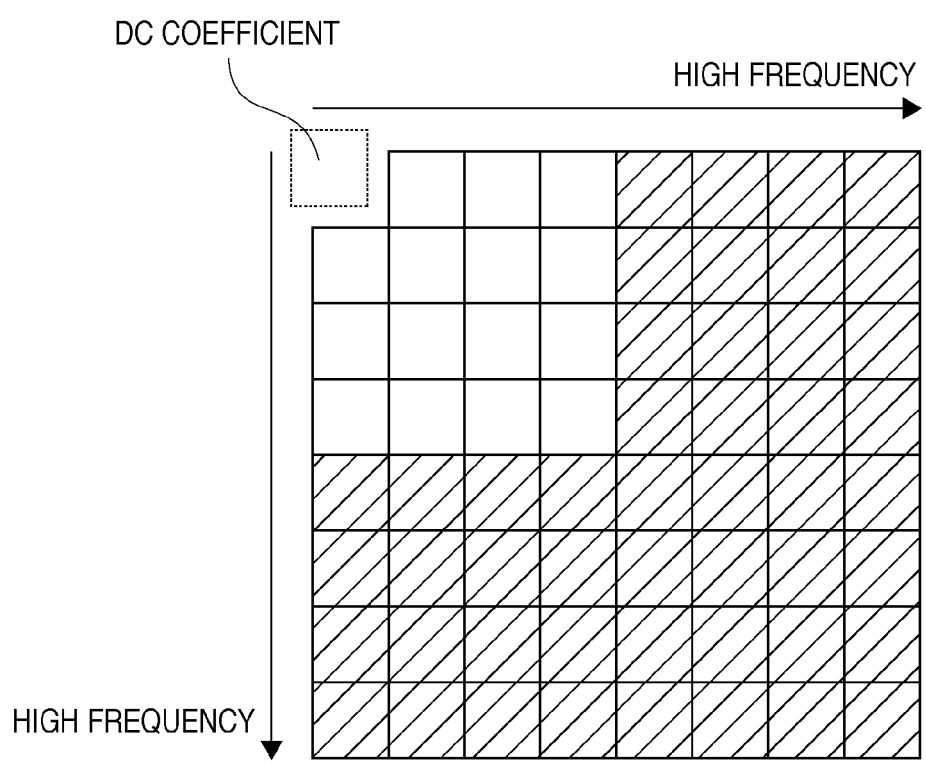
FIG. 14 is a view showing a masking process target area for 8×8 DCT coefficients.

The AC coefficient masking unit 1602 replaces, out of the reconstructed 8×8 quantized coefficient values, values in the frequency band represented by the hatched portion in FIG. 14 with 0, except the 4×4 values at the upper left corner, thereby reducing both the actual horizontal and vertical resolutions to ½.

The Huffman encoder 1603 Huffman-codes (re-entropy-codes) the matrix of the quantized coefficient values masked by the AC coefficient masking unit 1602 again, thereby generating and outputting encoded MCU data.

Note that it is not always necessary to reconstruct the AC coefficients in the high-frequency component masking re-encoder 1605. The same effect as described above can be obtained even by another arrangement of the high-frequency component masking re-encoder 1605 which decodes the encoded MCU data of the block of interest and replaces the encoded data from the position indicated by the star in FIG. 17 with EOB codes, except the codes up to the position. In this case, coefficient information in the band indicated by the hatched portion is partially contained in the encoded MCU data.

The selector 1604 refers to a determination result output from a character containing block determination unit 1101 and expanded text area information obtained from an area expanding unit 1011. The selector 1604 acquires the encoded data of the MCU block of interest from one of a block re-encoder 1021, the encoded block data acquisition unit 1012, a DC difference correction unit 1102, and the high-frequency component masking re-encoder 1605, and outputs the selected encoded data to a code stream generating unit 1018. Details of the selection process of the selector 1604 will be described below.

The selector 1604 determines, by referring to the information of an expanded text area ER1 output from the area expanding unit 1011, whether the MCU block of interest is located inside the expanded text area ER1. If the MCU block of interest is located outside the expanded text area ER1, the selector 1604 selects and outputs the encoded data from the high-frequency component masking re-encoder 1605. The high-frequency component masking re-encoder 1605 performs the process using the encoded MCU data extracted from the encoded block data acquisition unit 1012. For this reason, the resolution of the encoded MCU data output from the selector is actually ½ of the original resolution.

On the other hand, if the MCU block of interest is located inside the expanded text area ER1, the operation is determined depending on the determination result from the character containing block determination unit 1101, as in the second embodiment. The method of selecting the output in accordance with the determination result is the same as in the second embodiment, and a description thereof will not be repeated.

As described above, according to the third embodiment, in adaptive coding in which image data is separated into character image data and background image data, and they are encoded by suitable encoding methods, use of temporarily stored intermediate data reduces the block re-encoding process for acquiring encoded background image data. Especially, it is possible to reduce the number of blocks to be re-encoded by using encoded data even inside a text area. Especially in this embodiment, the resolution of the background image is lowered by discarding data corresponding to the high-frequency components of the intermediate data. This easily decreases the code amount while suppressing the visual degradation as much as possible.

[Modification of Third Embodiment]

An example will be described below in which the process of the third embodiment is implemented by a computer program. The apparatus arrangement can be the same as in the modification of the first embodiment shown in FIG. 12, and a description thereof will not be repeated. The procedure of a process of causing a CPU 1401 to execute an application program stored in an external storage device 1407 in FIG. 12 will be described below with reference to the flowchart in FIGS. 18A and 18B. This program can easily be understood as a program basically including functions (subroutines) corresponding to the constituent elements shown in FIG. 16. However, a buffer 1005, block information holding unit 1004, and character image data buffer 1008 shown in FIG. 16 are allocated in a RAM 1402 in advance. An intermediate data storage unit 1002 is allocated in the external storage device 1407.

The overall sequence of the process of the image processing application program executed by the CPU 1401 is the same as in FIG. 9 described in the first embodiment. However, as described above in the second embodiment, block information having the structure shown in FIG. 13 is recorded when decoding intermediate encoded data, i.e., in step S902 of FIG. 9. Additionally, in the modification of the third embodiment, the contents of the process in step S908 where background image data is encoded are different.

Figure 18A:
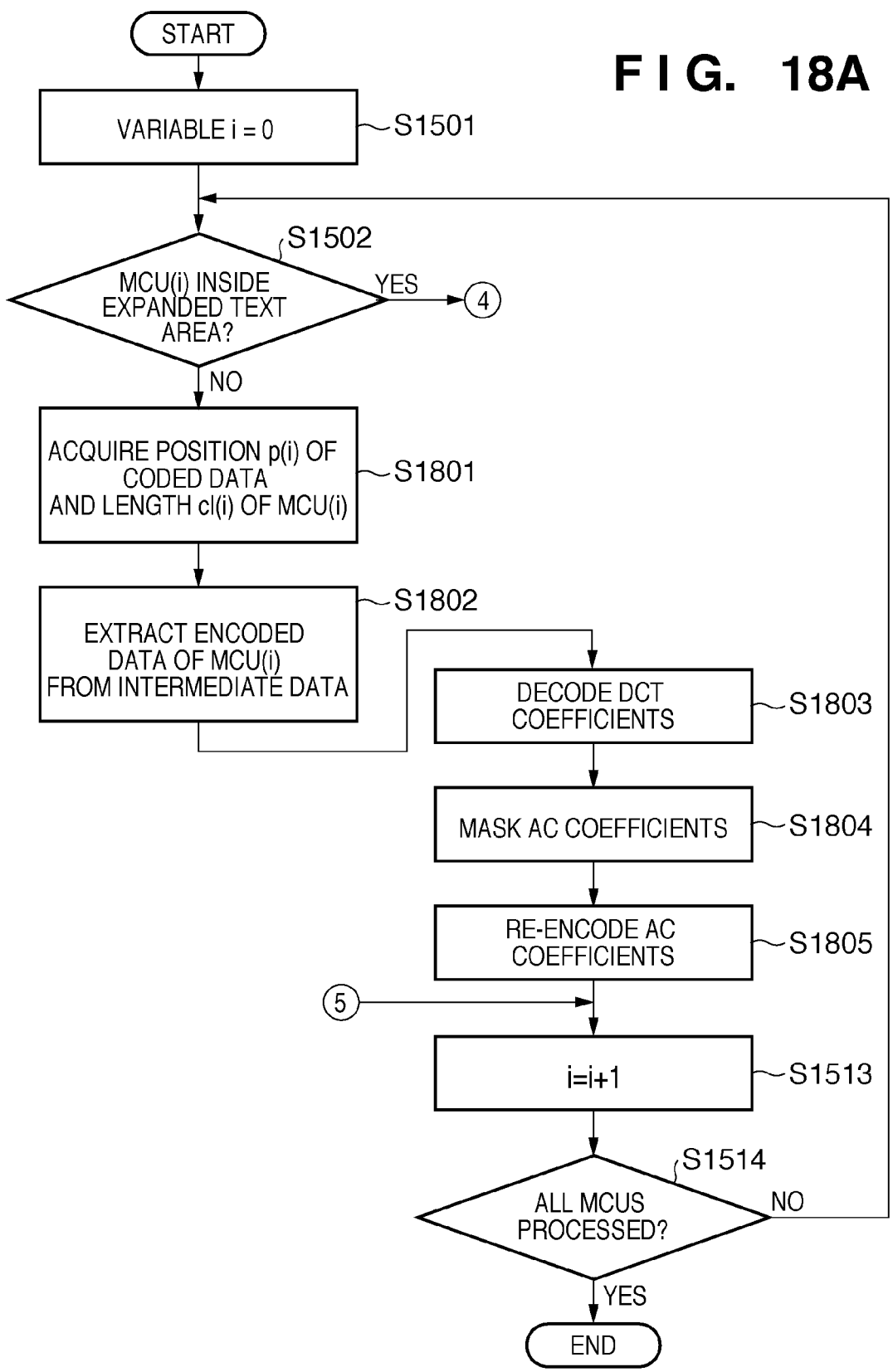
FIGS. 18A and 18B are flowchart illustrating the procedure of a background image encoding process according to a modification of the third embodiment.
Figure 18B:
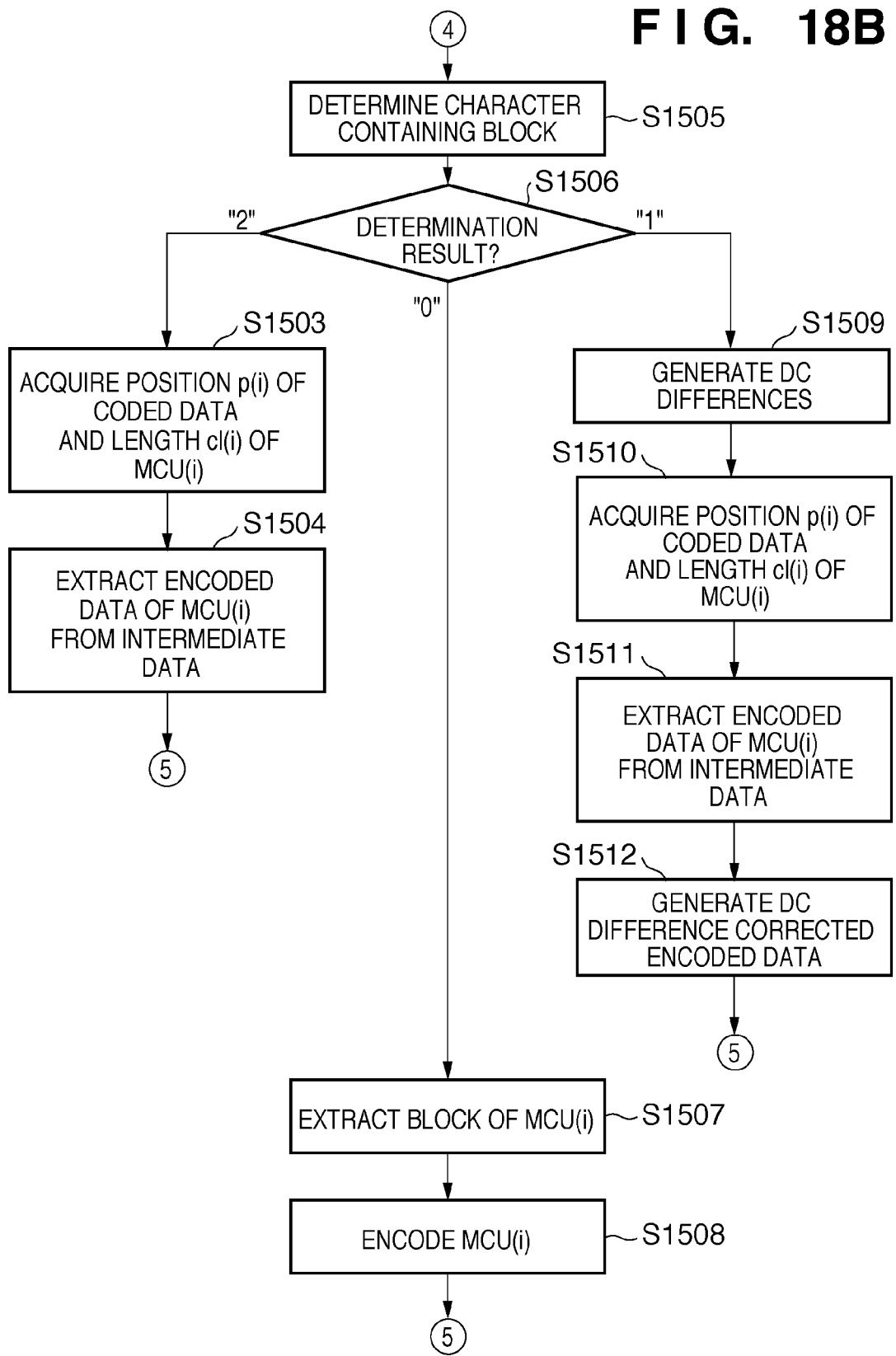

The sequence of the background image data encoding process will be explained with reference to the flowchart in FIGS. 18A and 18B. The flowcharts in FIGS. 18A and 18B is mostly the same as that in FIGS. 15A and 15B described in the second embodiment. The same step numbers as in FIGS. 15A and 15B denote the same processes in FIGS. 18A and 18B, and a description thereof will not be repeated.

The process to be executed when the MCU block of interest is located outside an expanded text area is different from that in FIGS. 15A and 15B.

In step S1801, a position p(i) of coded data and a code length cl(i) of the MCU block of interest are read out from the block information stored in the RAM 1402.

In step S1802, data corresponding to cl(i) bits from the p(i)th bit of the intermediate data stored in the external storage device 1407 are extracted to extract the codes of the MCU block of interest.

The processes in steps S1801 and S1802 correspond to the process of the encoded block data acquisition unit 1012.

In step S1803, the encoded MCU data extracted in step S1802 is decoded to reconstruct the quantized DC coefficient values. Note that the quantized DC coefficient values are held as differences (corresponding to the process of the DCT coefficient decoder 1601).

In step S1804, out of the 8×8 quantized DC coefficient values of each component of the block of interest, high-frequency components corresponding to the hatched portion in FIG. 14 are masked with 0 (corresponding to the process of the AC coefficient masking unit 1602).

In step S1805, the matrix of the quantized coefficient values processed in step S1804 is Huffman-coded again, thereby generating and outputting encoded MCU data (corresponding to the process of the Huffman encoder 1603).

The remaining processes are the same as in the modification of the second embodiment.

The modification can provide the same functions and effects as in the third embodiment, as is apparent from the above description. More specifically, in adaptive coding in which image data is separated into character image data and background image data, and they are encoded by suitable encoding methods, use of temporarily stored intermediate data reduces the block re-encoding process for acquiring encoded background image data. Especially, it is possible to reduce the number of blocks to be re-encoded by using encoded data even inside a text area. Especially in this embodiment, the resolution of the background image is lowered by discarding data corresponding to the high-frequency components of the intermediate data. This easily decreases the code amount while suppressing the visual degradation as much as possible.

[Fourth Embodiment]

An implementation method of the image processing apparatus of the third embodiment has been described above, which aims at obtaining high compression performance by lowering the resolution of background image data outside an expanded text area to ½. The background image holds the high resolution inside the expanded text area in consideration of the influence of a character pixel determination error. Assume that a pixel which should be determined as a pixel of a character is determined as a background pixel. In this case, if the resolution decreases to ½, the difference in image quality between the background and the foreground characters may increase and become noticeable. However, it is unnecessary to hold the high resolution in all blocks of an expanded text area. Only portions which are supposed to include characters need to hold the original resolution. In the fourth embodiment, an example will be described in which the resolution is adaptively changed when encoding the background image in an expanded area.

Figure 19:
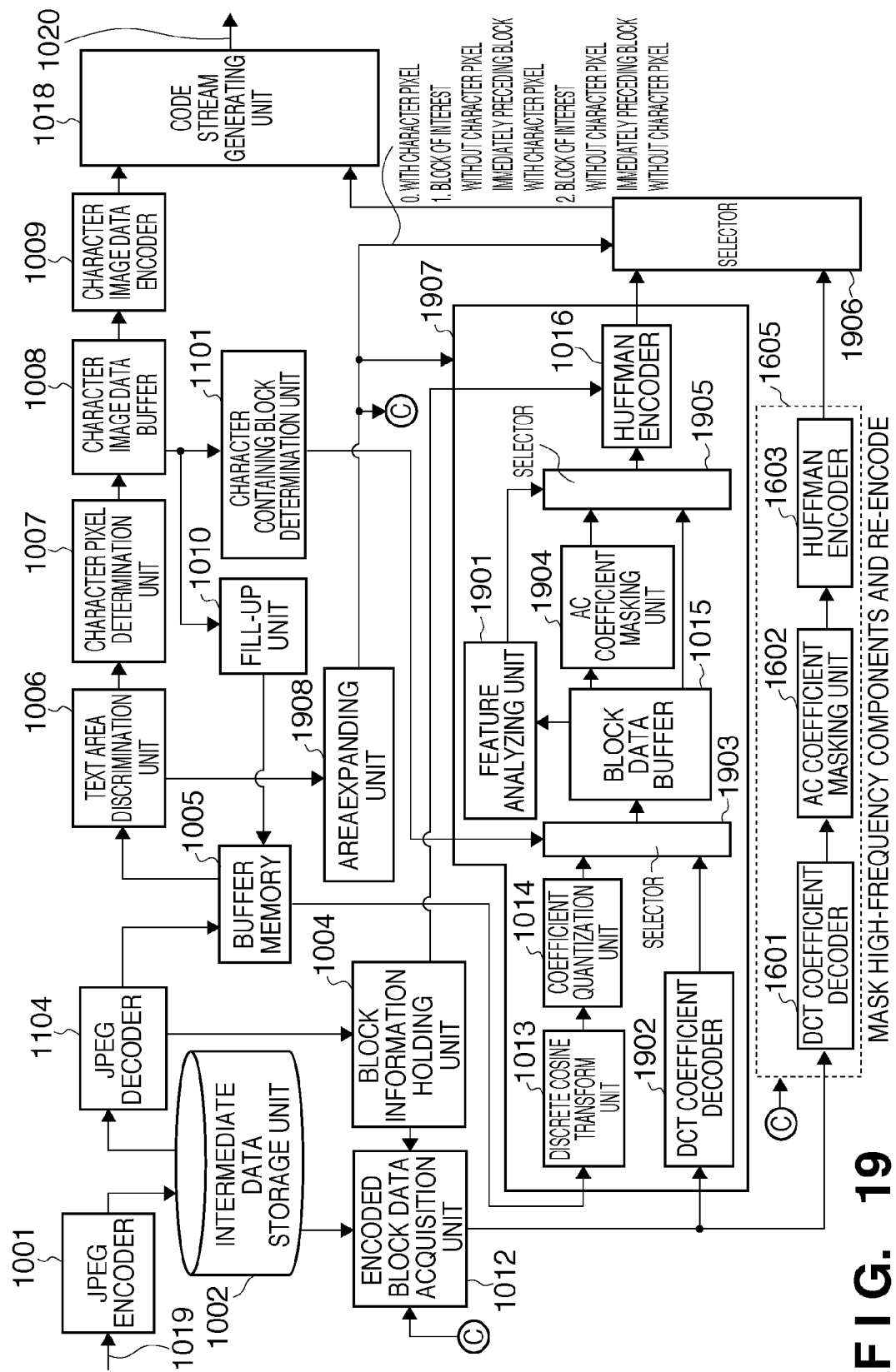
FIG. 19 is a block diagram showing the arrangement of an image encoding apparatus according to the fourth embodiment.

FIG. 19 is a block diagram showing the arrangement of an image processing apparatus according to the fourth embodiment. The same reference numerals as in FIGS. 1, 11, and 16 described in the first, second, and third embodiments denote blocks having the same functions in FIG. 19.

The arrangement shown in FIG. 19 is different from that in FIG. 16 of the third embodiment in that the DC difference correction unit 1102 and the block re-encoder 1021 are integrated into an adaptive resolution re-encoder 1907, and a 2-input 1-output selector 1906 is used in place of the 4-input 1-output selector 1604. Additionally, in place of the area expanding unit 1011, an area expanding unit 1908 which executes a slightly different operation is used. The remaining components are the same as in the third embodiment, and a description thereof will not be repeated.

An image encoding process of the fourth embodiment will be described below.

The area expanding unit 1908 generates an expanded text area ER1 by expanding the range of a text area TRi output from a text area discrimination unit 1006.

The expanded text area ER1 of the fourth embodiment is obtained by expanding a group of MCU blocks including the text area TRi by a size of one block to each of the upper, lower, left, and right sides.

The adaptive resolution re-encoder 1907 generates the encoded data of a block of interest based on the background image data of the block of interest stored in a buffer 1005 or the encoded MCU data of the block of interest obtained from an encoded block data acquisition unit 1012.

The adaptive resolution re-encoder 1907 includes a discrete cosine transform unit 1013, coefficient quantization unit 1014, DCT coefficient decoder 1902, selector 1903, feature analyzing unit 1901, AC coefficient masking unit 1904, selector 1905, and Huffman encoder 1016.

The blocks in the adaptive resolution re-encoder 1907 will be described below.

The discrete cosine transform unit 1013 extracts the pixel data of the MCU block of interest from the buffer 1005 and generates 8×8 matrix coefficients for each component using discrete cosine transform.

The coefficient quantization unit 1014 quantizes each coefficient using a quantization step value corresponding to the coefficient position and outputs the quantized matrix coefficients to the selector 1903.

On the other hand, the DCT coefficient decoder 1902 decodes Huffman codes of the encoded MCU data obtained by the encoded block data acquisition unit and reconstructs the matrix of the quantized coefficient values of each component. The DC coefficients are held as difference values.

On the basis of the determination result output from a character containing block determination unit, the selector 1903 writes, in a block data buffer 1015, the output from the coefficient quantization unit 1014 functioning as a first processing unit or the DCT coefficient decoder 1902 functioning as a second processing unit. If the determination result is "0", the output from the coefficient quantization unit 1014 is selected. If the determination result is "1" or "2", the output from the DCT coefficient decoder 1902 is selected.

The feature analyzing unit 1901 determines whether the 8×8 quantized DCT coefficient matrix stored in the block data buffer 1015 contains many high-frequency components. This determination is done by comparing the sum of the absolute values of high-frequency components with a preset threshold (if the sum exceeds the threshold, it is determined that many high-frequency components are included; if the sum is equal to or smaller than the threshold, it is determined that there are few high-frequency components). If the coefficient matrix includes many high-frequency components, the feature analyzing unit 1901 outputs "0" to the selector 1905 as the determination result. Otherwise, the feature analyzing unit 1901 outputs "1".

The AC coefficient masking unit 1904 replaces, out of the 8×8 quantized coefficient values stored in the block data buffer 1015, values in the frequency band represented by the hatched portion in FIG. 14 with 0, thereby reducing the actual resolution to ½.

The selector 1905 selects one of the quantized coefficient matrix masked by the AC coefficient masking unit 1904 and the quantized coefficient matrix stored in the block data buffer 1015 based on the feature determination result from the feature analyzing unit 1901, and outputs the selected quantized coefficient matrix to the Huffman encoder 1016. More specifically, if the determination result from the feature analyzing unit 1901 is "0", the selector 1905 selects the quantized coefficient matrix from the block data buffer 1015 and outputs it to the Huffman encoder 1016. If the determination result is "1", the selector 1905 selects the quantized coefficient matrix from the AC coefficient masking unit 1904 and outputs it to the Huffman encoder 1016.

The Huffman encoder 1016 Huffman-codes the matrix of the quantized coefficient values input via the selector 1905 again, thereby generating and outputting encoded MCU data. Note that if the target matrix of quantized coefficient values is stored in the block data buffer 1015 via the discrete cosine transform unit 1013 and the coefficient quantization unit 1014, it is necessary to obtain the DC difference values by referring to the immediately preceding block stored in the block information holding unit 1004. This process is unnecessary if the quantized coefficient matrix is obtained from the DCT coefficient decoder 1902 because the DC coefficients are held as difference values.

The selector 1906 acquires the encoded data of the MCU block of interest from one of the adaptive resolution re-encoder 1907 and a high-frequency component masking re-encoder 1605 by referring to expanded text area information obtained from the area expanding unit 1908. The selector 1906 outputs the acquired encoded data to a code stream generating unit 1018. This will be described below in detail.

The selector 1906 determines, by referring to the information of the expanded text area ER1 output from the area expanding unit 1908, whether the MCU block of interest is located inside the expanded text area ER1. If the MCU block of interest is located outside the expanded text area ER1, the selector 1906 selects the encoded MCU data from the high-frequency component masking re-encoder 1605 and outputs it to the code stream generating unit 1018. The high-frequency component masking re-encoder 1605 performs the process using the encoded MCU data extracted from the encoded block data acquisition unit 1012. For this reason, the resolution of the selected and output encoded data is actually ½ of the original resolution.

On the other hand, if the MCU of interest is located inside the expanded text area ER1, the operation is determined depending on the determination result from the character containing block determination unit 1101, as in the second embodiment. The method of selecting the output in accordance with the determination result is the same as in the second embodiment, and a description thereof will not be repeated.

As described above, according to the fourth embodiment, in adaptive coding in which image data is separated into character image data and background image data, and they are encoded by suitable encoding methods, use of temporarily stored intermediate data reduces the block re-encoding process for acquiring encoded background image data. Especially in this embodiment, out of the background image, only blocks which are located in the expanded text area and have high-frequency components holds the high resolution. The resolution of the remaining blocks is lowered. This easily decreases the code amount while suppressing the visual degradation as much as possible. It is therefore possible to expect an effect of suppressing generation of a visual image quality difference in the character portion, which is caused by a determination error when separating the foreground and background images.

[Modification of Fourth Embodiment]

An example will be described below as the modification of the fourth embodiment, in which the process of the fourth embodiment is implemented by a computer program. The apparatus arrangement can be the same as in the modification of the first embodiment shown in FIG. 12, and a description thereof will not be repeated. The procedure of a process of causing a CPU 1401 to execute an application program stored in an external storage device 1407 in FIG. 12 will be described below with reference to the flowchart in FIGS. 20A and 20B. This program can easily be understood as a program basically including functions (subroutines) corresponding to the constituent elements shown in FIG. 19. However, the buffer 1005, the block information holding unit 1004, a character image data buffer 1008, and the block data buffer 1015 shown in FIG. 19 are allocated in a RAM 1402 in advance. An intermediate data storage unit 1002 is allocated in the external storage device 1407.

The overall sequence of the process of the image processing application program executed by the CPU 1401 is the same as in FIG. 9 described in the first embodiment. However, as described above in the second embodiment, block information having the structure shown in FIG. 13 is recorded when decoding intermediate encoded data, i.e., in step S902 of FIG. 9. Additionally, in the modification of the fourth embodiment, the contents of the process in step S908 where background image data is encoded are different.

Figure 20A:
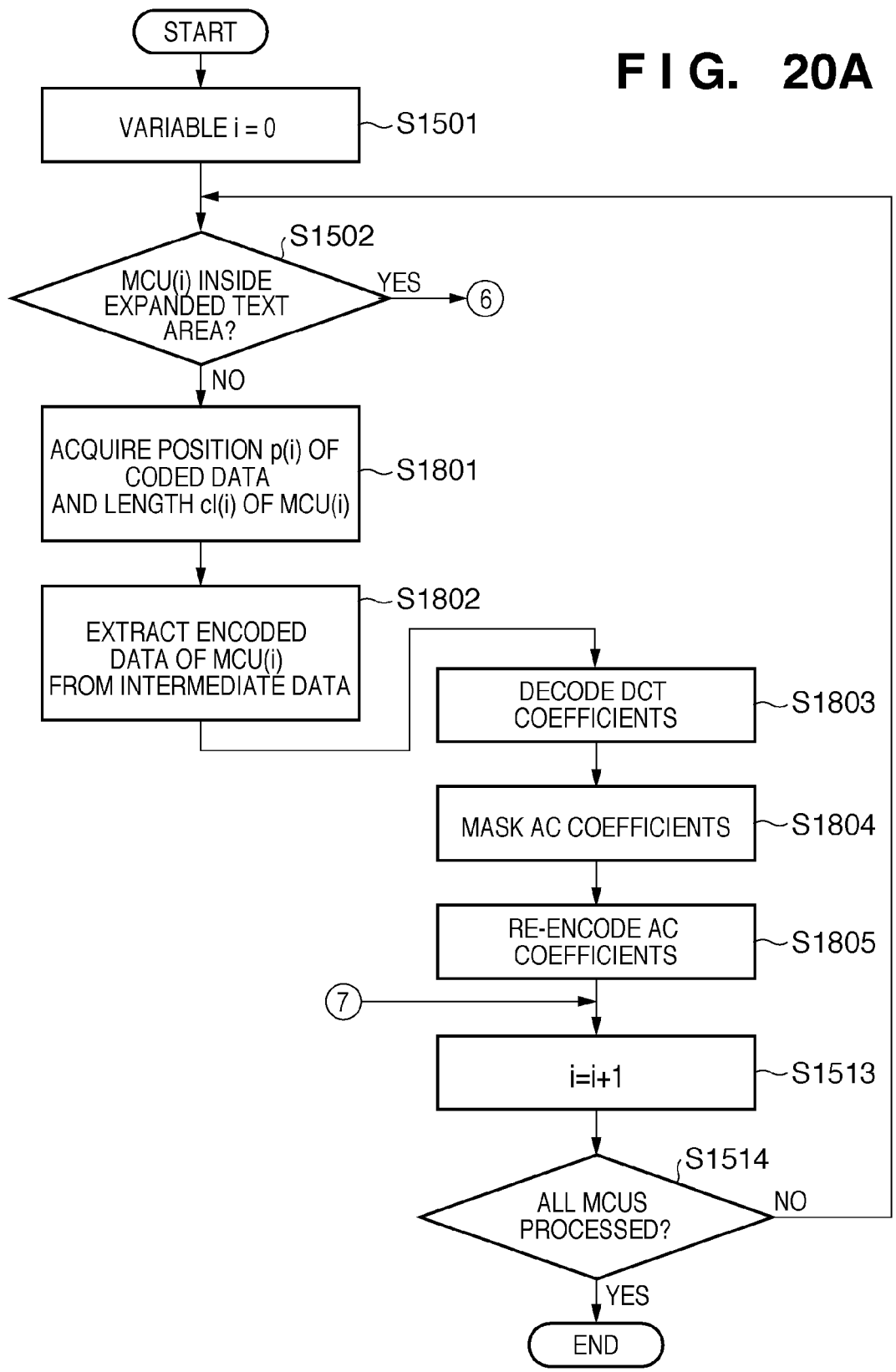
FIGS. 20A and 20B are flowchart illustrating the procedure of a background image encoding process according to a modification of the fourth embodiment.
Figure 20B:
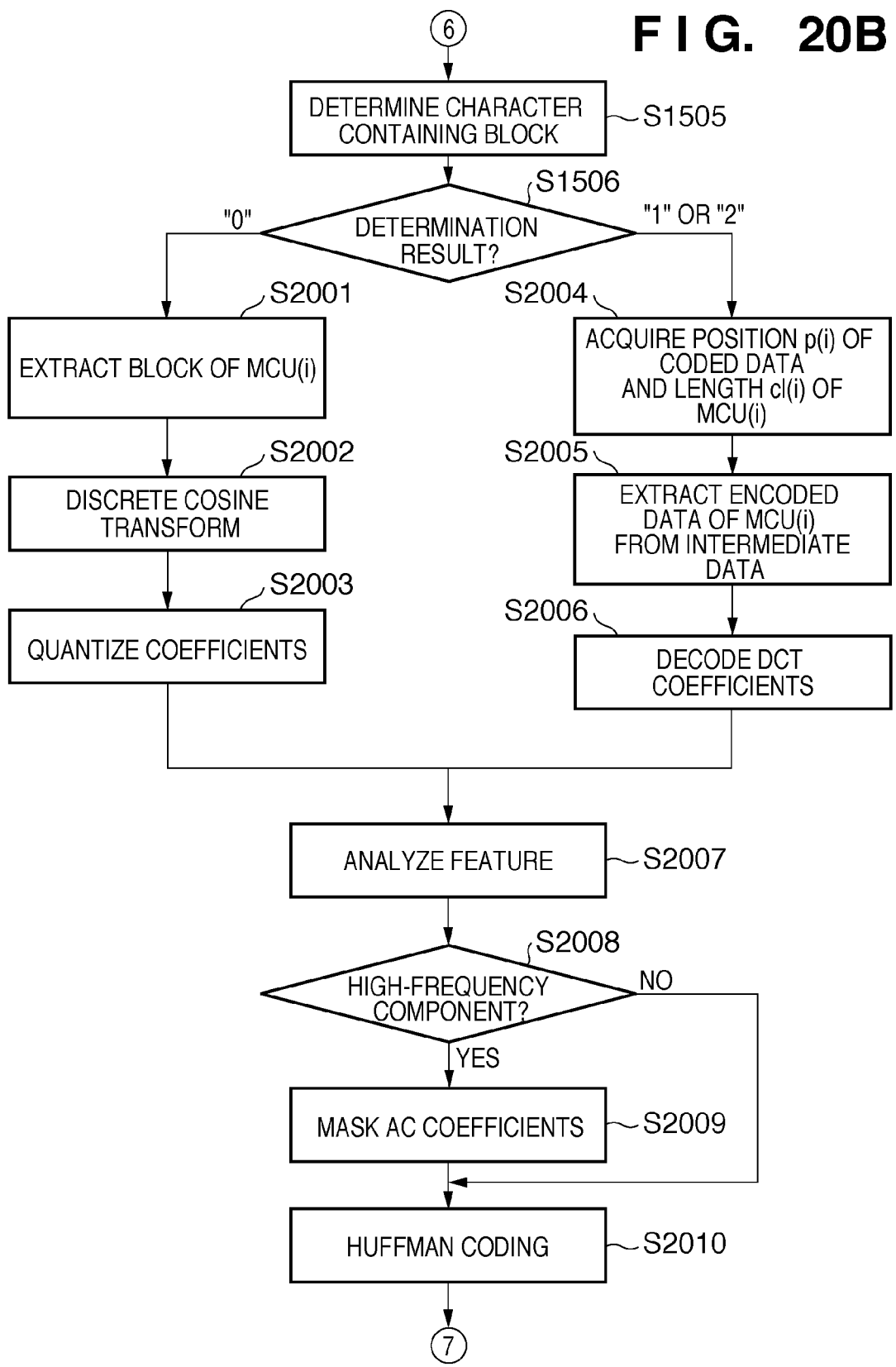

The flowchart in FIGS. 20A and 20B illustrates details of step S908. The sequence of the background image data encoding process will be explained with reference to FIGS. 20A and 20B. The flowcharts in FIGS. 20A and 20B are mostly the same as that in FIGS. 18A and 18B described in the third embodiment. The same step numbers as in FIGS. 18A and 18B denote the same processes in FIGS. 20A and 20B, and a description thereof will not be repeated.

The process to be executed when the MCU block of interest is located inside an expanded text area is different from that in FIGS. 18A and 18B.

If the MCU block of interest is located inside the expanded text area, character containing block determination is done in steps S1505 and S1506. If the determination result is "0", the process advances to step S2001. If the determination result is "1" or "2", the process advances to step S2004.

In step S2001, the pixel data of the block of interest is read out from the buffer 1005. In step S2002, each component of the readout MCU block undergoes discrete cosine transform to generate a DCT coefficient matrix.

The processes in steps S2001 and S2002 correspond to the process of the discrete cosine transform unit 1013.

In step S2003, the coefficient matrix obtained in step S2020 undergoes quantization to generate a quantized coefficient matrix (corresponding to the process of the coefficient quantization unit 1014).

On the other hand, if the determination result is "1" or "2", the process advances to step S2004. In step S2004, a position p(i) of coded data and a code length cl(i) of the MCU block of interest are read out from the block information stored in the block information holding unit 1004 (RAM 1402).

In step S2005, data corresponding to cl(i) bits from the p(i)th bit of the intermediate data stored in the intermediate data storage unit 1002 (external storage device 1407) are extracted to extract the codes of the MCU block of interest.

The processes in steps S2004 and S2005 correspond to the process of the encoded block data acquisition unit 1012.

In step S2006, the encoded MCU block data extracted in step S2005 is decoded to reconstruct the quantized coefficient values. Note that the quantized DC coefficient values are held as differences (corresponding to the process of the DCT coefficient decoder 1902).

In steps S2007 and S2008, it is determined by referring to the matrix of the quantized coefficient values obtained in step S2006 whether many high-frequency components are included (corresponding to the process of the feature analyzing unit 1901).

If the block includes many high-frequency components, the process advances to step S2009. Otherwise, the process skips step S2009 and advances to step S2010.

In step S2009, out of the 8×8 quantized DC coefficient values of each component of the block of interest, high-frequency components corresponding to the hatched portion in FIG. 14 are masked with 0 (corresponding to the process of the AC coefficient masking unit 1904).

In step S2010, the matrix of the quantized coefficient values is Huffman-coded again, thereby generating and outputting encoded MCU data (corresponding to the process of the Huffman encoder 1016).

The remaining processes are the same as in the modification of the third embodiment.

The modification can provide the same functions and effects as in the fourth embodiment, as is apparent from the above description. More specifically, in adaptive coding in which image data is separated into character image data and background image data, and they are encoded by suitable encoding methods, use of temporarily stored intermediate data reduces the block re-encoding process for acquiring encoded background image data. Especially in this embodiment, out of the background image, only blocks which are located in the expanded text area and have high-frequency components holds the high resolution. The resolution of the remaining blocks is lowered. This easily decreases the code amount while suppressing the visual degradation as much as possible. It is therefore possible to expect an effect of suppressing generation of a visual image quality difference in the character portion, which is caused by a determination error when separating the foreground and background images.

[Other Embodiments]

In the above embodiments, intermediate encoded data and encoded background image data are generated using JPEG. The present invention is also applicable to an arrangement using color conversion and sub-sampling, as can easily been understood. However, if the number of 8×8 pixel blocks in an MCU block increases, a consideration is necessary for the DC difference generation method. Any encoding method other than JPEG is also usable if it can generate codes dividable for each predetermined block. For example, JPEG2000 Part1 recommended as an international standard by ITU-T. T.800|ISO/IEC15444-1 may be used. In this case, the present invention can suitably be implemented by segmenting image data into tiles each having a predetermined size and encoding them.

The area discrimination method, foreground image data separation method, and foreground image data encoding method are not limited to those described in the above embodiments. For example, in the first to fourth embodiments, an example has been described in which the foreground image is encoded to binary data using MMR. However, any other binary encoding technique such as JBIG or JBIG-2 may be applied. The method may be combined with a method of extracting the outline of the foreground image and vectorizing it. Not only the method of encoding the foreground image into a binary image but also a method of encoding the foreground image into a limited color image or a multilevel image may be combined. As a detailed example, the present invention is also applicable to a method of encoding three layers including multilevel foreground and background images and a mask to select one of them, like MRC (ITU-T T.44), if the same encoding method is used for the intermediate data and background image data. As another example, a method of encoding the foreground image into multilevel data, and setting a transparent color to instruct to display the background in at least one of the foreground pixel values is also usable.

In the embodiments, an RGB image is encoded. However, the present invention is not limited to this and is also applicable to image data in various color spaces such as CMYK, Lab, and YCrCb.

Each of the above embodiments is implemented by a computer program. Normally, the computer program is stored in a computer-readable storage medium such as a CD-ROM and made executable by setting the storage medium in the read device (e.g., CD-ROM drive) of a computer and copying or installing the program in the system. Hence, the computer-readable storage medium is also incorporated in the present invention, as a matter of course.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-037946, filed Feb. 19, 2008, which is hereby incorporated by reference herein in its entirety.

What is claimed is:

1. An image encoding apparatus for inputting image data encoded for each pixel block formed from a plurality of pixels and re-encoding the image data, comprising:
an intermediate data storage unit which stores the encoded image data of re-encoding target as intermediate data;
a decoding unit which decodes each block of the intermediate data stored in said intermediate data storage unit and stores the decoded image data in a buffer;
a discrimination unit which discriminates a foreground image area including a character or line art by analyzing the image data stored in the buffer;
an identification unit which identifies each pixel of image data inside the foreground image area discriminated by said discrimination unit as a character or line art pixel included in the character or line art or a non-character or line art pixel and generates identification information;
a first encoding unit which encodes the identification information obtained by said identification unit and outputs the encoded identification information;
a replacement unit which replaces a value of the character or line art pixel inside the foreground image area of the image data stored in the buffer with a replacement value decided based on values of neighboring non-character or line art pixels;
a second encoding unit which generates encoded data of a pixel block based on the image data after replacement by said replacement unit;
an encoded data acquisition unit which acquires, from said intermediate data storage unit, encoded data of a pixel block; and
a selector that selects the encoded data from said second encoding unit if a pixel block of interest is inside the foreground image area, while selects the encoded data stored in said encoded data acquisition unit if the pixel block of interest is not inside the foreground image area.

2. The apparatus according to claim 1, wherein said decoding unit comprises an extraction unit which extracts block information to specify a location of the pixel block of interest in said intermediate data storage unit every time the encoded data of the pixel block of interest of the encoded image data stored in said intermediate data storage unit is decoded, and
said encoded data acquisition unit reads out the encoded data of the pixel block stored in said intermediate data storage unit by referring to the block information.

3. The apparatus according to claim 1, wherein said identification unit generates binary information representing that each pixel inside the foreground image area is the character or line art pixel or the non-character or line art pixel.

4. The apparatus according to claim 1, wherein said first encoding unit outputs color information of each character or line art pixel inside the foreground image area in addition to the encoded data.

5. The apparatus according to claim 1, wherein said encoded data acquisition unit directly outputs the encoded data of the pixel block stored in said intermediate data storage unit.

6. The apparatus according to claim 1, wherein
the image data of the re-encoding target is image data which has undergone discrete cosine transform, quantization, and entropy coding for each pixel block, and
said encoded data acquisition unit comprises a unit which decodes the encoded data of the pixel block stored in said intermediate data storage unit up to quantized coefficient values, masks component values in a preset area in high-frequency components with "0", and executes entropy coding again.

7. The apparatus according to claim 1, further comprising:
a block determination unit which determines, by referring to the identification information generated by said identification unit, whether the pixel block of interest inside the foreground image area includes the character or line art pixel; and
a selection unit which selects and outputs the encoded data generated by said second encoding unit if the pixel block of interest is located inside the foreground image area, and said block determination unit has determined that the pixel block of interest includes the character or line art pixel,
selects and outputs the encoded data generated by said encoded data acquisition unit if the pixel block of interest is located inside the foreground image area, and said block determination unit has determined that the pixel block of interest does not include the character or line art pixel, and
selects and outputs the encoded data generated by said encoded data acquisition unit if the pixel block of interest is located outside the foreground image area.

8. The apparatus according to claim 1, wherein
the image data of the re-encoding target is image data which has undergone discrete cosine transform, quantization, and entropy coding for each pixel block, the apparatus further comprises a block determination unit which determines, by referring to the identification information generated by said identification unit, whether the pixel block of interest inside the foreground image area includes the character or line art pixel, and said second encoding unit comprises:

a first processing unit which reads out the image data of the pixel block of interest from the buffer and calculates quantized coefficient values by performing discrete cosine transform and quantization;

a second processing unit which reads out encoded data corresponding to the pixel block of interest from said intermediate data storage unit and decodes the encoded data up to quantized coefficient values;

a selection unit which selects the quantized coefficient values generated by said first processing unit when said block determination unit has determined that the pixel block of interest includes the character or line art pixel, and selects the quantized coefficient values generated by said second processing unit when said block determination unit has determined that the pixel block of interest does not include the character or line art pixel;

a determination unit which determines whether an amount of high-frequency components in the quantized coefficient values selected by said selection unit is larger than a preset threshold;

a masking unit which masks component values in a preset area in the quantized coefficient values selected by said selection unit with "0" when said determination unit has determined that the amount of the high-frequency components in the quantized coefficient values is not more than the threshold; and an entropy coding unit which entropy-codes the quantized coefficient values selected by said selection unit when said determination unit has determined that the amount of the high-frequency components in the quantized coefficient values is larger than the threshold, and entropy-codes the quantized coefficient values after a masking process by said masking unit when said determination unit has determined that the amount of the high-frequency components in the quantized coefficient values is not more than the threshold.

9. A method of controlling an image encoding apparatus for inputting image data encoded for each pixel block formed from a plurality of pixels and re-encoding the image data, comprising the steps of:

storing the encoded image data of re-encoding target in a storage unit as intermediate data;

decoding each block of the intermediate data stored in the storage unit and stores the decoded image data in a buffer;

discriminating a foreground image area including a character or line art by analyzing the image data stored in the buffer;

identifying each pixel of image data inside the foreground image area discriminated in the discriminating step as a character or line art pixel included in the character or line art or a non-character or line art pixel and generating identification information;

encoding the identification information obtained in the identifying step and outputting the encoded identification information;

replacing a value of the character or line art pixel inside the foreground image area with a replacement value decided based on values of neighboring non-character or line art pixels;

generating encoded data of a pixel block based on the image data after replacement in the replacing step;

acquiring, from the storage unit encoded data of a pixel block; and selecting the encoded data generated in the generating step if a pixel block of interest is inside the foreground image area, while selecting the encoded data acquired in the acquiring step if the pixel block of interest is not inside the foreground image area.

10. A non-transitory computer-readable storage medium storing a computer program which is loaded into and executed by a computer to cause the computer to function as an image encoding apparatus of claim 1.

* * * * *